(12) United States Patent
Warmerdam et al.

(10) Patent No.: US 9,102,569 B2
(45) Date of Patent: Aug. 11, 2015

(54) PROCESS FOR HOT-FORGING SYNTHETIC CERAMIC

(75) Inventors: Jerry Warmerdam, Nevada City, CA (US); Joseph R. Cochran, Grass Valley, CA (US); Ross Guenther, Nevada City, CA (US); James L. Wood, Colfax, CA (US); Robert D. Villwock, Austin, TX (US)

(73) Assignee: CERAMEXT, LLC, Penn Valley, CA (US)

( * ) Notice: Subject to any disclaimer, the term of this patent is extended or adjusted under 35 U.S.C. 154(b) by 1198 days.

(21) Appl. No.: 12/614,102

(22) Filed: Nov. 6, 2009

(65) Prior Publication Data

US 2010/0117273 A1    May 13, 2010

Related U.S. Application Data

(62) Division of application No. 11/529,210, filed on Sep. 29, 2006, now abandoned.

(51) Int. Cl.
  *C04B 33/32* (2006.01)
  *C04B 35/18* (2006.01)
  (Continued)

(52) U.S. Cl.
  CPC ............ *C04B 35/18* (2013.01); *C04B 33/13* (2013.01); *C04B 33/1324* (2013.01); *C04B 33/1355* (2013.01); *C04B 33/20* (2013.01); *C04B 33/323* (2013.01); *C04B 33/326* (2013.01); *C04B 35/20* (2013.01); *C04B 35/6263* (2013.01);
  (Continued)

(58) Field of Classification Search
  CPC .. C04B 33/323; C04B 33/20; C04B 33/1355; C04B 33/1324; C04B 2235/604; C04B 2235/80
  USPC .................................................. 264/667, 678
  See application file for complete search history.

(56) References Cited

U.S. PATENT DOCUMENTS

| | | | |
|---|---|---|---|
| 1,809,214 A | 6/1931 | Pine et al. | |
| 1,809,215 A | 6/1931 | Pine et al. | |

(Continued)

FOREIGN PATENT DOCUMENTS

| | | |
|---|---|---|
| CN | 1275067 | 11/2000 |
| GB | 2237016 | 4/1991 |

(Continued)

OTHER PUBLICATIONS

Chinese Office Action mailed Feb. 22, 2012.

(Continued)

*Primary Examiner* — Erin Snelting
(74) *Attorney, Agent, or Firm* — Pillsbury Winthrop Shaw Pittman LLP

(57) ABSTRACT

The embodiments of the invention are directed to a synthetic ceramic comprising pyroxene-containing crystalline phase, a clast, and a glass phase, wherein at least a portion of the synthetic ceramic is plastically deformable in a certain temperature range. Other embodiments of the invention relate to a method of making a synthetic ceramic, comprising heating a green ceramic material to 900-1400° C., to a temperature sufficient to initiate partial melting of at least a portion of the green ceramic material, transferring the heated green ceramic material to a press, pressing the heated green ceramic material in a die at 1,000 to 10,000 psi, and transferring the heated, pressed green ceramic material to a furnace for cooling to form the synthetic ceramic.

26 Claims, 14 Drawing Sheets

(51) Int. Cl.
*C04B 33/13* (2006.01)
*C04B 33/132* (2006.01)
*C04B 33/135* (2006.01)
*C04B 33/20* (2006.01)
*C04B 35/20* (2006.01)
*C04B 35/626* (2006.01)

(52) U.S. Cl.
CPC . *C04B2235/3201* (2013.01); *C04B 2235/3206* (2013.01); *C04B 2235/3208* (2013.01); *C04B 2235/3232* (2013.01); *C04B 2235/3262* (2013.01); *C04B 2235/3272* (2013.01); *C04B 2235/3427* (2013.01); *C04B 2235/3436* (2013.01); *C04B 2235/3445* (2013.01); *C04B 2235/3454* (2013.01); *C04B 2235/3463* (2013.01); *C04B 2235/3472* (2013.01); *C04B 2235/3481* (2013.01); *C04B 2235/6021* (2013.01); *C04B 2235/6565* (2013.01); *C04B 2235/72* (2013.01); *C04B 2235/726* (2013.01); *C04B 2235/727* (2013.01); *C04B 2235/77* (2013.01); *C04B 2235/80* (2013.01); *C04B 2235/96* (2013.01); *C04B 2235/9623* (2013.01); *C04B 2235/9638* (2013.01)

(56) References Cited

U.S. PATENT DOCUMENTS

| | | | |
|---|---|---|---|
| 3,303,533 A | 2/1967 | King | |
| 3,557,575 A | 1/1971 | Beall | |
| 3,985,533 A | 10/1976 | Grossman | |
| 3,989,795 A | 11/1976 | McGee | |
| 4,173,484 A | 11/1979 | Kubovits | |
| 4,211,820 A | 7/1980 | Cantaloupe | |
| 4,301,324 A | 11/1981 | Kumar | |
| 4,871,384 A | 10/1989 | Kasuga | |
| 5,188,989 A | 2/1993 | Winkelbauer et al. | |
| 5,352,396 A * | 10/1994 | Zaragueta | 264/601 |
| 5,562,765 A | 10/1996 | Brosnan et al. | |
| 5,595,583 A | 1/1997 | Murnick | |
| 5,830,251 A | 11/1998 | Simpson et al. | |
| 6,068,803 A * | 5/2000 | Weyand et al. | 264/82 |
| 6,124,223 A | 9/2000 | Beall et al. | |
| 6,159,400 A | 12/2000 | Laquer | |
| 6,361,888 B1 | 3/2002 | Kriven et al. | |
| 6,547,550 B1 | 4/2003 | Guenther | |
| 2002/0004445 A1 | 1/2002 | Beall et al. | |
| 2002/0098965 A1 | 7/2002 | Terashi | |
| 2007/0049487 A1 | 3/2007 | Guenther et al. | |

FOREIGN PATENT DOCUMENTS

| | | |
|---|---|---|
| WO | 99/16727 | 4/1999 |
| WO | 2007024505 | 3/2007 |

OTHER PUBLICATIONS

Supplementary European Search Report, Application No. EP07843353, dated Jun. 28, 2011.

Torres et al., Mechanism of Crystallization of Pyroxene-Based Glass-Ceramic Glazes, Journal of Non-Crystalline Solids, 2004, vol. 347, pp. 45-51.

Ozel et al., Production and Characterisation of Iron-Chromium Pigments and Their Interactions with Transparent Glazes, Journal of the European Ceramic Society, 2003, vol. 23, pp. 2097-2104.

* cited by examiner

Photomicrograph of a thin section of hot-forged tile

Photomicrograph of a thin section of hot-forged tile, showing thin porous surface crust and part of non-porous interior.

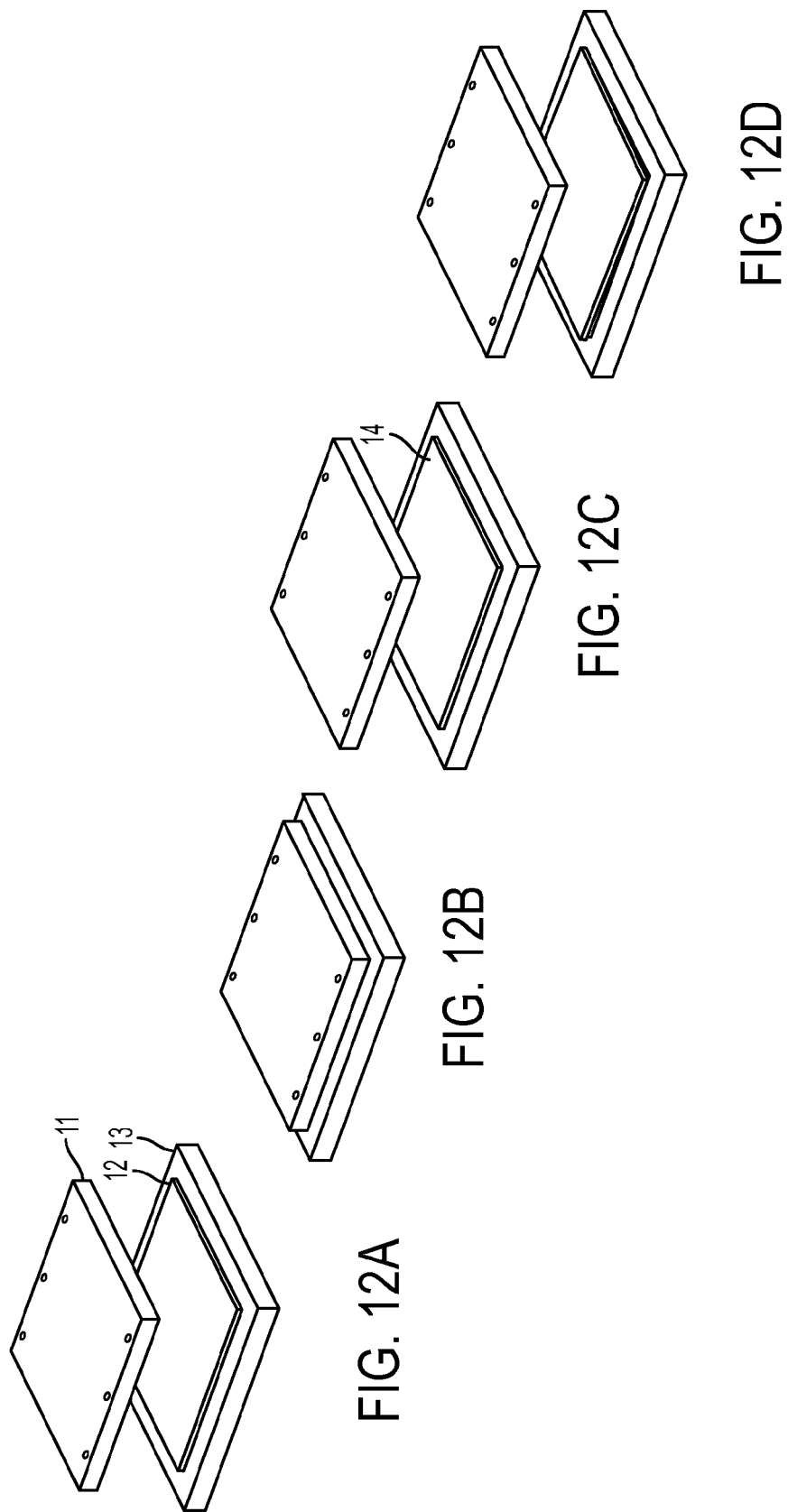

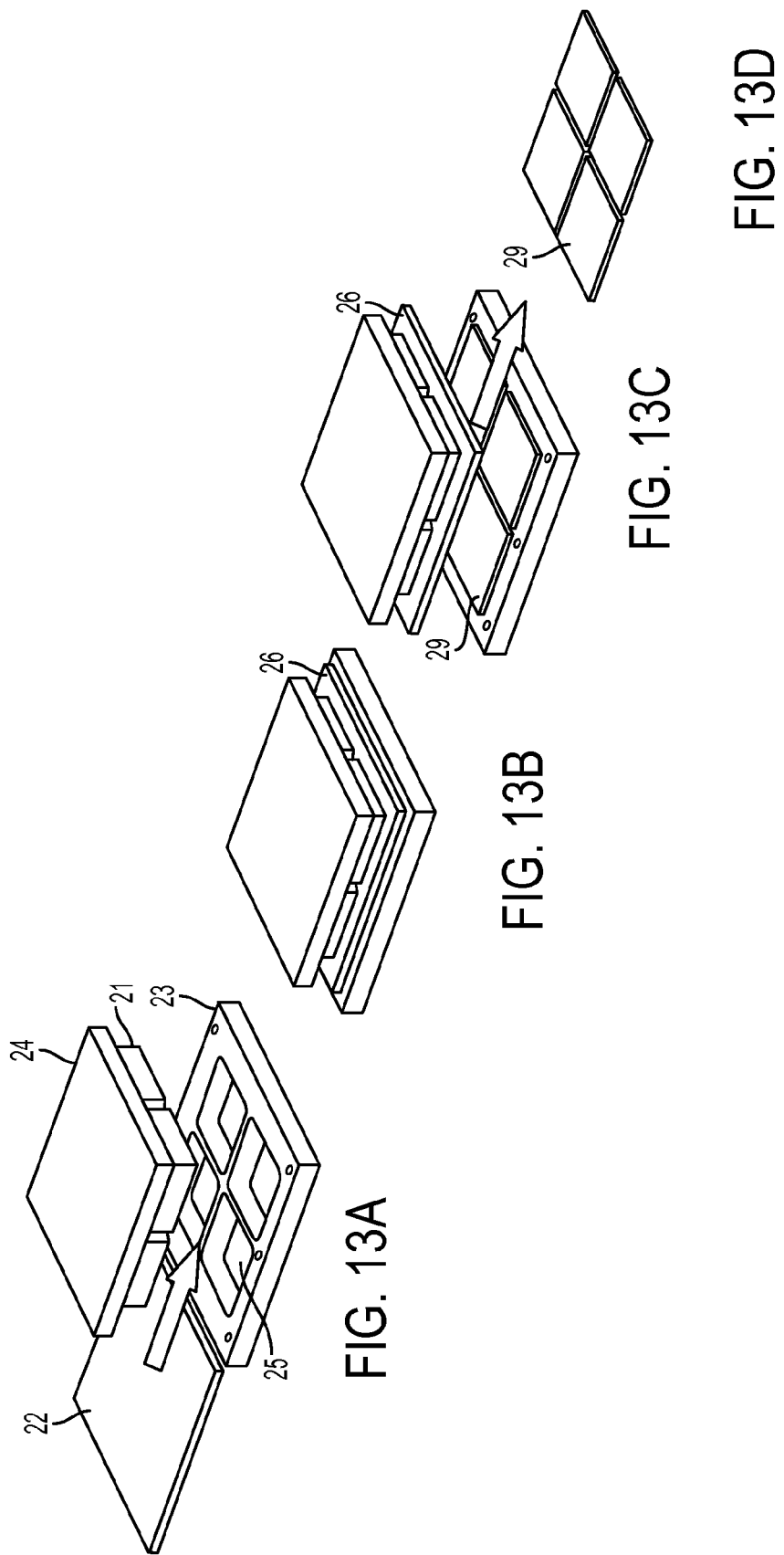

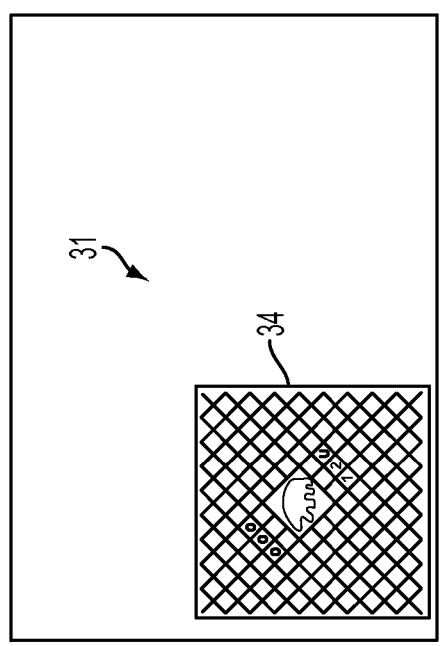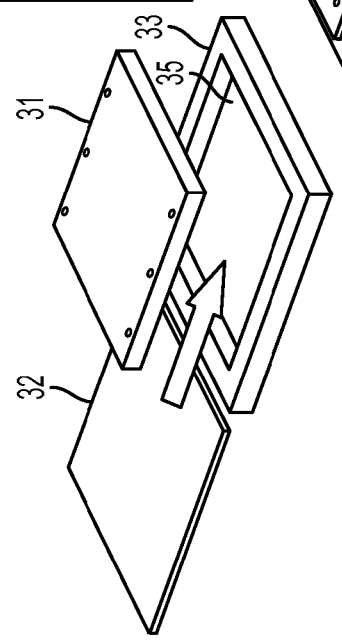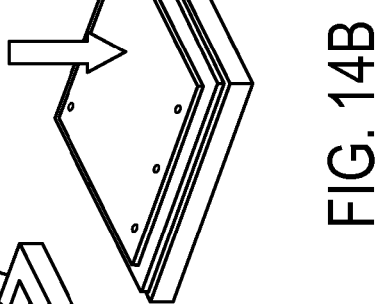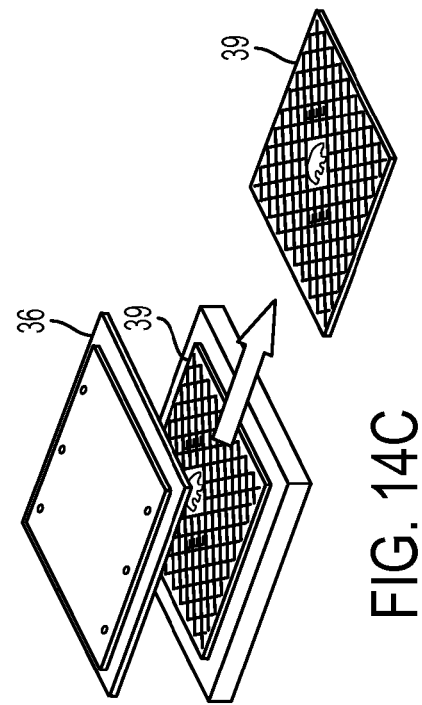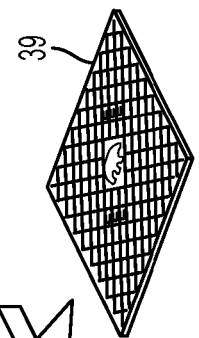

PROCESS FOR HOT-FORGING SYNTHETIC CERAMIC

RELATED APPLICATIONS

This application is a Divisional of U.S. Ser. No. 11/529,210, filed Sep. 29, 2006, entitled "Process and Apparatus for Hot-Forging Synthetic Ceramic", which is incorporated herein by reference. This application is related to U.S. Ser. No. 11/213,218, filed Aug. 25, 2005, entitled "Synthesized Hybrid Rock Composition, Method, and Article Formed by the Method," which is incorporated herein by reference. This application is also related to U.S. Ser. No. 09/596,271, now U.S. Pat. No. 6,547,550, issued on Apr. 15, 2003, entitled "Apparatus for hot vacuum extrusion of ceramics," U.S. Ser. No. 10/382,765, filed Mar. 5, 2003, entitled "Method and apparatus for hot vacuum extrusion of ceramics," all of which are incorporated herein by reference.

FIELD OF INVENTION

Embodiments of the invention relate to the field of advanced ceramics, particularly to the composition and manufacture of synthetic ceramic (also referred herein as a "hybrid rock material" or as "manufactured stone") such as ceramic tile of a ceramic composite that is plastically deformable at high temperature, and otherwise strong, with low porosity.

BACKGROUND

"Uniaxial hot pressing" and "hot isostatic pressing" of ceramics are well-known processing methods for sintering of advanced ceramics. These processes in the field of advanced ceramics might appear to be similar to the present invention, but are actually quite unrelated processes and are described in W. D. Kingery, "Introduction to Ceramics," John Wiley & Sons, New York, 1960, pp. 72-74, 394, and also D. W. Richardson, "Modern Ceramic Engineering," Marcel Dekker, Inc., New York, 1992, pp. 552-564, and also in the Background section of U.S. Pat. No. 6,159,400. A key distinction between hot pressing and the present invention is that hot pressing is conducted at approximately half the absolute melting temperature of the material, meaning it is in essence a solid-phase sintering process at high pressure, typically 6.9 to 34.5 MPa (1 to 5 ksi). Hot pressing also differs from the present invention in that pressure is applied to the material while it is still in a furnace. This requires that the pressing parts and molds be made from a highly heat-resistant material such as graphite. Graphite parts oxidize over time and are highly susceptible to wear, which makes the hot pressing process expensive and only in use for manufacture of high-cost specialized parts. Hot isostatic pressing diverges even further from the present invention, as described in Richardson, pp. 562-564.

The conventional method of forming ceramic tiles also differs from uniaxial hot pressing, hot isostatic pressing, and the present invention. The conventional method includes the steps of shaping and forming a ceramic composition containing ceramic powders, binder, and water, pressing the ceramic composition near room temperature and then firing the ceramic composition at high temperature near atmospheric pressure. The conventional ceramic tiles are rigid, brittle and cured to a permanently set (thermosetting) composition. Thus, the conventional ceramic tiles cannot be recycled by and reformed by heating and melting the ceramic tile like a thermoplastic polymer can be recycled and reformed. The ceramic tiles of this invention overcome the above deficiencies of conventional ceramic tiles.

U.S. Pat. No. 3,989,795 to Thomas McGee, entitled "Method of compressing ceramic refractory bodies," describes "hot forging" of ceramic refractory blocks with low thermal conductivity for use in the bed of a steel-making furnace, and provides a method to reduce wear of the die or mold. McGee's method requires a complicated and expensive apparatus to remove the sides of the mold and avoid friction. Further, the preheated blank (or billet) in McGee's method must be smaller than the mold so that it can be placed inside. This requires the material flow out to engulf the entire space, which means that the material must have higher processing temperature in order to have low enough viscosity. The higher processing temperature is more expensive to operate, and tends to liquefy a greater portion of the starting material, resulting in a weaker final product.

SUMMARY OF THE INVENTION

The embodiments of the invention relate to a synthetic ceramic comprising pyroxene-containing crystalline phase, a clast, and a glass phase, wherein at least a portion of the synthetic ceramic is plastically deformable in a certain temperature range. Preferably, the synthetic ceramic is recyclable. Preferably, the clast contains silicon or a silicon-containing compound. Preferably, glass phase is continuous or co-continuous. Preferably, the pyroxene-containing crystalline phase is continuous or discrete. Preferably, the clast comprises remnant clasts of natural origin. Preferably, the glass phase is distributed as a matrix with the clast interspersed therein. Preferably, the glass phase is distributed as a matrix with the pyroxene-containing crystalline phase interspersed therein. Preferably, the pyroxene-containing crystalline phase contains crystals formed from a melt with a mineral composition comprising a mineral selected from the group consisting of wollastonite, plagioclase feldspar, anhydrite, calcium sulfate and combinations thereof. Preferably, the pyroxene contains an element selected from the group consisting of Mg, Ca, Fe, Na, Mn, Al, Ti, Si, O and combinations thereof. Preferably, the pyroxene-containing crystalline phase comprises crystallites having a chemistry consistent with members of the pyroxene group of minerals having the chemistry $(Ca,Na,Mg,Fe^{2+},Mn,Fe^{3+},Al,Ti)_2[(Si,Al)_2O_6]$. Preferably, the pyroxene-containing crystalline phase comprises crystallites having chemistry consistent with members of the pyroxene group of minerals having the chemistry $(Mg, Fe^{2+}Ca)(Mg,Fe^{2+})[Si_2O_6]$. Preferably, the pyroxene-containing crystalline phase comprises crystallites having chemistry consistent with members of the pyroxene group of minerals having the chemistry $Ca(Mg,Fe)[Si_2O_6]$. Preferably, the synthetic ceramic has an open porosity of less than 0.5 percent.

Preferably, the synthetic ceramic has a modulus of rupture in the range of about 55 MPa to 83 MPa (8,000 to 12,000 psi). Preferably, the synthetic ceramic has water absorption of less than 0.5 percent. Preferably, the synthetic ceramic has a Taber abrasive wear index in the range of 50-400. More preferably, the synthetic ceramic has a breaking strength of greater than 2.2 kN (500 lbs). Preferably, the synthetic ceramic is physically deformable in the range of 200-1500° C. More preferably, the synthetic ceramic is physically deformable in the range of 900-1400° C.

Another embodiment relates to a method of making a synthetic ceramic, comprising heating a green ceramic material to 900-1400° C., to a temperature sufficient to initiate partial melting of at least a portion of the green ceramic material, transferring the heated green ceramic material to a press, pressing the heated green ceramic material in a die at about 6.8 MPa to 68 MPa (1,000 to 10,000 psi), and transferring the heated, pressed green ceramic material to a furnace for cooling to form the synthetic ceramic. Preferably, the method does not require a heated die. Preferably, the method does not require exposing the green ceramic material, the heated green ceramic material or the heated pressed green ceramic material to vacuum. Preferably, the synthetic ceramic is a ceramic tile. Preferably, the green ceramic material is made by mixing quarry fines with water to form a mixture and extruding the mixture through a die. Preferably, the green ceramic material contains no binder. Preferably, the heating the green ceramic material is to 1000-1200° C. Preferably, the pressing the heated green ceramic material in a die is at about 11 MPa to 41 MPa (1,600 to 6,000 psi). Preferably, the cooling to form the synthetic ceramic is in the range of 600-1000° C., preferably at about 800° C.

BRIEF DESCRIPTION OF THE DRAWINGS

FIG. 9 shows a number of large and elongated pores, which are the darkest structures in the photomicrograph.

FIG. 10 shows only a few small and mostly round pores, which are the darkest structures in the photomicrograph.

FIG. 12 and its subfigures: FIG. 12A shows the preheated tile blank 12 after transferring from a hot furnace to a press, where it is placed entirely within the cavity of a lower die 13. Upper die 11 is lowered and pressure is applied as depicted in FIG. 12B. In FIG. 12C, the upper die 11 is raised and the forged tile 14 is revealed. In FIG. 12D, the forged tile is shown free from both die surfaces, ready for transfer to a cooling furnace.

FIG. 13 and its subfigures: In FIGS. 13A and 13B, an upper set of dies 21, affixed to a die platen 24, is lowered and punched through the hot tile blank, leaving an unpressed "picture frame" of scrap 26 above the lower die 23 while compressing the remainder of the tile blank primarily uniaxially in the 4 square cavities. In FIG. 13C, the upper die is raised, taking the scrap 26 with it, and the four hot-forged tiles 29 are removed as shown in FIG. 13D.

FIG. 14 and its subfigures: FIG. 14A shows the top face of the upper die 31, lower die 33, and the tile blank 32 being moved over the lower die cavity 35. In FIG. 14B, the upper die is lowered and punched through the hot tile blank, leaving a frame of unpressed trim scrap 36 above the lower die 33 while compressing the remainder of the tile blank uniaxially in the cavity. In FIG. 14C, the upper die is raised, taking the scrap 36 with it, and the hot-forged tile 39 is removed and transferred. FIG. 14D shows the hot forged tile 39 being removed and transferred to a cooling furnace. The hot forged tile 39 has a surface design in relief comprising a "waffle" pattern, lettering and an image. FIG. 14E shows the bottom face of the upper die 31 with the recessed pattern 34 including a "waffle" pattern, recessed lettering and silhouette of a bear.

DETAILED DESCRIPTION

Figure 1:
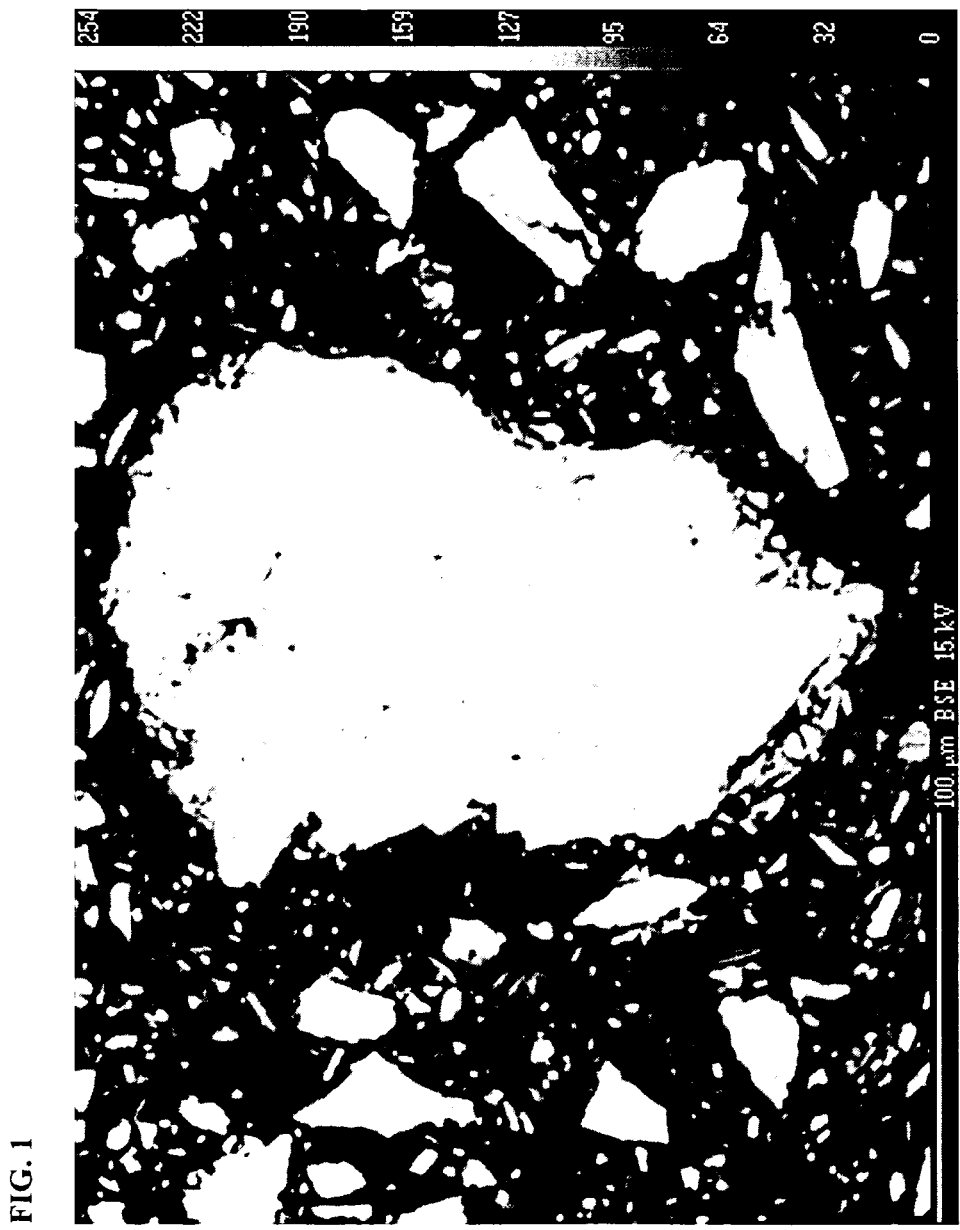
FIG. 1 shows a microscopic view of fine grained angular particles or clasts of a pulverized mineral and rock sediments found in crushed rock quarry fines and mine tailings. The particles seen here are composed of both single mineral grains and multi-mineral rock fragments.

In contrast to the prior art, the methods of the embodiments of the invention use a simple die and punch mechanism with few moving parts. Friction is reduced by slight reproducible thermal shrinkage of the forged part before ejection. Because the upper die punches the preheated blank into the lower cavity, the billet is not required to flow and engulf the space, which allows lower processing temperature, excellent reproducible control of dimensions of the final part, and a stronger product.

As used in the specification and claims, the singular forms "a", "an" and "the" include plural references unless the context clearly dictates otherwise.

The term "clast" refers to rock fragment or grain resulting from the breakdown of larger rocks.

The term "glass phase" refers to a material that is amorphous, as may be determined by x-ray diffraction.

The term "crystalline phase" or "crystallite phase" refers to a material that has an ordered structure at an atomic length scale, as may be determined by x-ray diffraction.

The term "ceramic" refers to an article having a glazed or unglazed body of crystalline or partly crystalline structure, or of glass, which body is produced from essentially inorganic, non-metallic substances and either is formed from a molten mass which solidifies on cooling, or is formed and simultaneously or subsequently matured by the action of the heat. The term covers inorganic non-metallic materials whose formation is due to the action of heat.

The term "synthetic" refers to something prepared or made artificially, not by nature.

The term "synthetic ceramic" refers to a ceramic that is prepared or made artificially, especially not of natural origin. A synthetic ceramic can, however, have constituents of natural origin such as remnant clasts of natural origin.

The term "plasticity" refers to the property of materials to deform permanently after force is applied and released.

The term "plastically deformable" refers to materials that deform permanently after force is applied and released.

The term "recycled" means using waste or non-conforming material to manufacture a new product. Recycling involves altering the physical form of an object or material and making a new object from the altered material. One must generate waste or non-conforming material in order to recycle the waste. Therefore, if one is recycling, one would first already generate waste or non-conforming material.

The term "waste" refers to objects or materials for which no use or reuse is generally intended.

The term "recyclable" refers to a material that can be recycled.

The term "reuse" refers to using an object or material again, either for its original purpose or for a similar purpose, without significantly altering the physical form of the object or material, is not recycling because reuse does not alter the physical form of an object. Reuse is preferred to recycling because reuse consumes less energy and fewer resources than recycling. However, reuse is not always possible, particularly for a ceramic that has been fired and already been formed into an object and the ceramic then has to be used in a new and different object.

The term "porous medium" or a porous material is a solid (often called frame or matrix) permeated by an interconnected network of pores (voids) filled with a fluid (liquid or gas). Usually both the solid matrix and the pore network (also known as the pore space) are assumed to be continuous, so as to form two interpenetrating continua such as in a sponge. The space occupied by the interpenetrating continua of pore network is the space occupied by "open pores." The space occupied by discrete pores is the space occupied by "closed pores." Many natural substances such as rocks, soils, biological tissues (e.g. bones), and man made materials such as cements, foams and ceramics can be considered as porous media. A poroelastic medium is characterized by its porosity, permeability as well as the properties of its constituents (solid matrix and fluid).

The term "porosity" of a porous medium (such as rock or sediment) describes how densely the material is packed. It is the proportion of the non-solid volume to the total volume of material, and is defined by the ratio:

$$\phi = \frac{V_p}{V_m}$$

where $V_p$ is the non-solid volume (pores and liquid) and $V_m$ is the total volume of material, including the solid and non-solid parts. Both $\phi$ and n are used to denote porosity. Porosity is a fraction between 0 and 1, typically ranging from less than 0.01 for solid granite to more than 0.5 for peat and clay, although it may also be represented in percent terms by multiplying the fraction by 100%.

The term "open porosity" is the porosity of the medium resulting from the interpenetrating continua of pore network is the space occupied by "open pores."

The term "permeability" is a measure of the ability of a material to transmit fluids through it. The usual unit for permeability is the darcy, or more commonly the milli-darcy or and (1 darcy≈$10^{-12}$ $m^2$). The darcy is defined using Darcy's Law which can be written as:

$$v = \frac{\kappa \Delta P}{\mu \Delta x}$$

where: $\kappa$ is the permeability of a medium, $v$ is the superficial (or bulk) fluid flow rate through the medium, $\mu$ is the dynamic viscosity of the fluid, $\Delta P$ is the applied pressure difference, $\Delta x$ is the thickness of the medium. The darcy is referenced to a mixture of unit systems. A medium with a permeability of 1 darcy permits a flow of 1 cm/s of a fluid with viscosity 1 cP (1 mPa·s) under a pressure gradient of 1 atm/cm.

The term "modulus of rupture" (or MOR) refers to the breaking stress (in MPa or psi) when a bar of known dimensions is flexed to failure in a three-point bend configuration. For the case of a thin cylindrical rod, MOR=$8PL/\pi d^3$, where P=the force to break the rod, L=the distance between the outer supports, and d=the diameter of the rod.

The term "inosilicates" refers to single-chain and double-chain silicate minerals.

The term "pyroxene" refers to a group of inosilicates comprising single-chain, non-hydrated ferromagnesian chain silicates. Pyroxenes, particularly enstatite and hypersthene (the iron-containing version of enstatite), as well as augite, diopside, bronzite, and pigeonite, are generally not present in vitreous, semi-vitreous or porcelain ceramics. Rather, pyroxenes have been detected, via X-Ray Diffraction analysis (XRD) and Scanning Electron Microprobe analysis (microprobe) using an Energy Dispersive X-ray Spectrometer (EDS), only in high porosity ceramics, such as some non-vitreous ceramics. However, microprobe analysis reveals that those pyroxenes in the non-vitreous ceramic have a morphology that indicates that they are the result of solid-state chemical reactions rather than crystallization from a melt phase.

The term "amphibole" refers to a group of inosilicates comprising double-chain, hydrated ferromagnesian chain silicates. Amphiboles, particularly in the form of hornblende, have been detected in raw mine rock materials, but not in processed material, because these compounds do not survive high temperature processing as a result of dehydration and bond degradation during the heating process.

The term "wollastonite" refers to a calcium silicate mineral in the inosilicate group. Wollastonite and plagioclase are common ingredients of some non-vitreous conventional ceramics to achieve specific ceramic types and properties. However, wollastonite and plagioclase have not been detected using microprobe analysis and EDS techniques as a newly crystallized phase in conventional ceramics, rather they appear as sintered primary mineral grains.

The term "tectosilicates" refer to framework silicate minerals, including minerals such as quartz and the feldspar group. Plagioclase feldspar is a solid solution series of feldspar minerals with varying amounts of sodium and calcium.

The term "sulfate minerals" refer to a group of minerals containing sulfur. Gypsum and anhydrite are calcium sulfates, with anhydrite forming the dehydrated form and gypsum the hydrated form. Anhydrite and/or gypsum are not conventionally present in raw starting materials, and have not been detected in conventional non-vitreous, semi-vitreous or vitreous ceramics.

The embodiments of the invention relate to ceramic thermoplastic compositions made by thermoplastic processing techniques such as compression molding, extrusion and hot vacuum extrusion, and further relate to novel processes to manufacture ceramic thermoplastic compositions. Specifically, the ceramic thermoplastic compositions employ as starting material mine tailings, mine development rock, ash, slag, quarry fines, slimes, or similar mineral waste materials.

In one of the processes tested by the inventors, the quarry fines were mixed with 5 to 8% water as a binder, pressed in the shape of a tile in a die at 20-80° C. under a pressure of about 19 to 49 MPa (2800 to 6900 psi) to make a green tile blank. The green tile blanks were also made by mixing quarry fines with 16 to 20% water, and extruding tile shapes through a die, at 20-80° C., optionally applying vacuum to the extruder to reduce porosity. The green tile blanks were dried then fired to 1000-1200° C. make ceramic tiles. However, the ceramic tiles were porous with poor dimensional control.

The inventors recognized the above problems of quarry fines-containing ceramic tiles and overcame the problems by significantly improving the composition and process of manufacturing the synthetic ceramics such as ceramic tiles containing quarry fines such that the synthetic ceramics of the embodiments of the invention have a very low porosity (<0.5%), and excellent dimensional control. In one embodiment of the invention, the synthetic ceramics containing quarry fines were made by preheating the green tile blanks to 1000-1200° C., to a temperature sufficient to initiate partial melting of some of the material in the green tile, then "hot forging" the material by quickly transferring the hot tile to a press, pressing the tile in a die at 10 to 70 MPa (1,600 to 10,000 psi) then quickly transferring the hot, pressed tile to a furnace for controlled cooling. The process does not require heated dies, or vacuum, to get a dense product. The resulting synthetic ceramic containing synthetic rock material has excellent properties for tile applications, including high modulus of rupture (55 to 83 MPa, or 8,000 to 12,000 psi), low water absorption (<0.5%), high Taber abrasion resistance, high tile breaking strength (>2.2 kN, or >500 lbs). Tile shapes made from the material may be polished to have the appearance of polished stone, but with superior properties. Mechanical strength and abrasion resistance are comparable to or higher than quality porcelain tile.

Furthermore, in embodiments of the invention it is possible during hot forging to use a die to punch through a preheated tile into a second die cavity below. This makes a clean sheared cut on all sides of the pressed tile, leaving a small amount of recyclable unpressed scrap, and a precisely sized pressed article. Using this punch-through method, the inventors could make synthetic rock with the properties described above, but also with the additional features of excellent dimensional control and the ability to punch out complicated shapes. Excellent dimensional control allows the tile to compete with expensive cut stone and requires little or no grout during installation. The manufacturing process allows superior control of facial dimensions without the need for grinding to size. Size control is about ten times superior to the best industry performance for porcelain ceramic tile. Further, because of the punch-through method, the process does not require perfect control of die fill during the initial cold pressing, nor does it require perfect dimensional control during initial cold extrusion to get excellent dimensional control of the final hot forged product. In conventional tile manufacturing, expensive and time-consuming particle sizing and feed conditioning are required in order to perfectly fill the cold-pressing die and make square tiles with repeatable dimensions. The inventors punch-through process avoids the need for spray drying or expensive pre-feed conditioning earlier in the process. The inventors also found that it is also possible to press a decorative or functional pattern or design into either or both of the top and bottom surfaces of the tile during hot forging.

In the embodiments of the synthetic ceramic of this invention, the green tile blank is made at room temperature using a cold press or extrusion, preferably without any binder, unlike a conventional green tile of the prior art. Yet, without any binder in the composition of the green tile, the synthetic ceramic of the composition contains very low porosity and is plastically deformable in certain temperature ranges. The synthetic ceramic of the embodiments of the invention contains ingredients that are plastically deformable at a temperature in the range of 200-1500° C., preferably in the range of 500-1400° C., more preferably in the range of 800-1300° C., and most preferably in the range of 1000-1200° C.

As the synthetic ceramic is plastically deformable in certain temperature ranges, the synthetic ceramic or scraps thereof is recyclable. The recycled material could be re-used to make new synthetic ceramics or other objects of the embodiments of this invention.

The synthetic ceramics produced with the embodiments of the invention possess microscopic fabrics that share similarities to rock materials found in nature. However, the various characteristic microfabric elements that describe these synthetic rock materials are not all found in any one natural rock. For this reason these synthetic rock materials could be described as "hybrid rocks" with microfabric elements reminiscent of various types of sedimentary, igneous, and metamorphic rocks.

The synthetic ceramic of the embodiments of the invention provides a crystalline and glass composition derived from processing raw mine tailings and similar waste materials, which can be used to create valuable articles of manufacture and products for a wide variety of uses, particularly, but without limitation, in the commercial and residential construction industry, for example floor, wall, and roof tile, building cladding, brick, blocks, siding, panels, pavers, countertops, aggregates for road base, and other building materials.

The composition of the synthetic ceramic of the embodiments of the invention could comprise a clast phase, a glass phase, and a crystalline (also referred to herein as crystallite) phase. The clast phase could further comprise mineral grains, mineraloid grains, glass spherules, or rock fragments, any of which may have been partially melted, or partially dissolved, or partially transformed by chemical reaction. The glass phase could provide a matrix that cements together the clasts. The crystalline phase could be fully enveloped by the glass phase, having formed by growth from the melt.

The composition of clasts fused together by a glass phase, which further could include a newly formed crystalline phase, could be characterized by a microscopic aggregate breccia (synthetic rock/glass matrix) structure with superior physical and structural characteristics, including low porosity, low absorption, increased strength and durability, retained plasticity to facilitate reformation subsequent to initial processing, and readily distinguishable chemical attributes in comparison to conventional synthetic rock materials, as demonstrated by scanning-electron-microprobe analysis.

The glass phase (glass matrix) could be created as a result of partially melting a suite of original raw mineral constituents, which may include feldspar, quartz and mineral materials found in a wide variety of rock types, and which further may be present as individual mineral grains (monomineralic) or as rock fragments (polymineralic). After an optimal melting period, the resulting glass matrix is cooled over an optimal cooling period, and during the cooling period unique silicate and non-silicate minerals with varying proportions of iron, magnesium, calcium and sulfur crystallize from the melt to form small crystallites distributed throughout the glass matrix. Importantly, the newly formed secondary crystallites include specific inosilicate, tectosilicate and sulfate compounds that are not present in the starting raw material, and are not found in commercially-available ceramics in the same fashion. Occasionally, some of these minerals may be found in commercially-available ceramics; however those minerals are not secondary crystallites formed from a melt phase, but rather are remnants of the raw starting material. The specific minerals formed in applicants ceramic materials are influenced by the unique chemistry of the waste mineral feedstock materials such as mine tailings, mine development rock, ash, slag, quarry fines, slimes, etc.

The embodiments of the compositions and articles of manufacture of the invention comprise original rock and mineral fragments as well as newly formed mineral phases, which renders them compositionally distinct not only from the raw starting material, but—more importantly—from conventional synthetic rock compositions and corresponding articles of manufacture.

Some embodiments of the compositions and articles of the invention contain pyroxene inosilicates, newly formed plagioclase, wollastonite and anhydrite, which heretofore have not been detected in low porosity, vitreous synthetic rock materials. Specific pyroxene minerals that may form in the synthetic ceramics of the embodiments of the invention may include, but are not limited to, one or more of the following: augite, diopside, hypersthene, pigeonite, bronzite and enstatite.

One embodiment of the method of manufacturing the synthetic ceramics employs a heating and cooling strategy that completely obviates the need for the addition of crystallization catalysts or nucleation agents. That is, heating of the raw material to a temperature at which some, but not all, of the components of the raw material begin to at least partially melt. At these temperatures, a liquid phase is created that can flow to coat individual aggregate particles, bind them together, and fill in void spaces. The liquid phase can also begin to dissolve additional solid material. Upon cooling at reasonable unquenched rates, this liquid phase can partially crystallize without the need for addition of nucleation additives because, due to partial melting, there are already present solid surfaces to initiate crystallization. Mechanical pressure to squeeze the material at temperature can help to distribute the liquid phase among the various solid surfaces and increase binding. Vacuum to remove gas from void spaces can help to eliminate resistance to filling in the voids with the liquid phase.

Typically the first components of the raw material to liquefy are glass particles or feldspars, many of which liquefy at temperatures of approximately 1050 to 1300° C. Preferably, the raw material could include glass or feldspar that becomes liquid at temperatures in the range of 1100 to 1200° C. Cooling from these temperatures preferably takes place at a rate slow enough to allow crystallization to occur, preferably about 1 to 50° C. per minute, more preferably about 5 to 20° C. per minute, and most preferably about 10° C. per minute when cooling is initiated from the peak temperature for the first few hundred degrees of cooling. Cooling at a maximum rate of 10° C. per minute is also especially preferred as the material passes through the temperature range of 600 to 500° C., to avoid fracture due to the associated volume change of the beta-to-alpha phase transition of any quartz that may be present in the material.

In the embodiments and examples of the present invention, an amount of mine tailings, for example Historic Idaho-Maryland Mine Tailings ("HIMT"), containing both rock fragments and individual mineral grains, could be heated in a forming chamber to an optimal temperature, preferably in the range of 1100 to 1200° C., and thereby partially melted over an optimal period of time, preferably about 0.5 to 6 hours. During the partial melting process, the HIMT raw material could be simultaneously exposed to pressure modification, which preferably could be the application of mechanical force to the material in the range of 0.007 to 1.4 MPa (1 to 200 psi), and which further may also be the application of vacuum to reduce the absolute pressure to within the range of about 1 to 600 mbar in order to remove interstitial gas phase.

Heating the HIMT raw material with pressure modification could result in a partially melted matrix, which could then be allowed to cool over an optimal period of time. During the cooling period, newly formed mineral crystallites with varying proportions of silicon, aluminum, iron, magnesium, calcium, and sulfur crystallize from the initial raw material melt to form small crystallites distributed throughout a glass matrix.

The newly formed crystallized minerals occurring in the glass matrix comprise a combination of minerals from the pyroxene group, plagioclase feldspar group and sulfate group. Morphological characteristics of the newly crystallized minerals indicate their secondary growth from the initial raw material melt, as opposed to from a solid state glass reaction. Most notably, these secondary growth indicators include the newly formed minerals' generally uniform size, crystalline morphology and uniform composition preferably throughout the glass matrix.

In one embodiment, the invention provides a vitreous, non-porous, impermeable polycrystalline composition comprising an amount of clasts, an amount of glass matrix, and an amount of at least one secondary crystalline phase. The clasts could comprise grains of single minerals, such as quartz, or rock fragments, or unmelted glass fragments, or mineraloid grains. The glass matrix is preferably distributed between the clasts, bonding to them and filling in the nearly all of the interstitial space. The secondary crystalline phase is preferably contained within the glass matrix, and contains crystals formed from a melt with a mineral composition of ferromagnesian minerals, pyroxenes (for example, clinopyroxene, orthopyroxene, augite, diopside, hypersthene, pigeonite, bronzite, enstatite), illmanite, rutile, wollastonite, cordierite, and anhydrite.

In one embodiment, the invention provides a method for processing mine tailings resulting in a vitreous, non-porous, impermeable polycrystalline composition. For example, the method could include the steps of air drying a sampling of mine tailings to less than 3% moisture; screening the mine tailings to remove material larger than 516 microns; and calcining the mine tailings in air at approximately 900° C. The mine tailings could then be mechanically compacted in a tube with an approximate pressure of about 2.4 MPa (350 psi) at an approximate temperature of 1130° C. for approximately 60 hours, and subsequently cooled at a rate of approximately 1 to 3° C. per minute, forming a composition having a clast phase, a glass phase, and at least one crystalline phase. The clast phase could contain grains of single minerals, such as quartz, or rock fragments. The glass phase is preferably distributed between the clast phase, bonding to clast particles and filling in nearly all surrounding interstitial space. The crystalline phase is preferably contained within the glass phase, and could include crystals formed from a melt with a mineral composition consistent with minerals selected from the group consisting of bronzite, augite and pigeonite.

In another embodiment, the invention provides a method for processing mine tailings resulting in a vitreous, non-porous, impermeable polycrystalline composition. The method could include air drying a sampling of mine tailings to less than 3% moisture; screening the mine tailings to remove material larger than 516 microns; and calcining the mine tailings in air at approximately 900° C. The mine tailings could then be mechanically compacted in a tube with an approximate pressure of about 2 MPa (300 psi) at an approximate temperature of 1140° C. for approximately 6 hours, and subsequently cooled at a rate of approximately 10 to 20° C. per minute, forming the composition, comprising a clast phase, a glass phase, and at least one crystalline phase. The clast phase could include grains of single minerals, such as quartz, or rock fragments. The glass phase is distributed between the clast phase, bonding to clast particles and filling in nearly all surrounding interstitial space. The at least one crystalline phase is preferably contained in the glass phase and could include crystals formed from a melt with a mineral composition consistent with minerals selected from the group consisting of bronzite, augite, pigeonite, anhydrite and ilmanite.

In another embodiment, the invention provides a method for processing metavolcanic mine development rock resulting in a vitreous, non-porous, impermeable polycrystalline composition. The method could include air drying a sampling of the development rock to less than 3% moisture; and screening the development rock through a 516 micron screen. Development rock powder is then processed through the apparatus described in U.S. Pat. No. 6,547,550 (Guenther), incorporated herein by reference, at a temperature of approximately 1160° C., with mechanical pressure oscillating between approximately 206 kPa (30 psi) and 1.1 MPa (160 psi) for a defined time period, in a partial vacuum atmosphere for approximately 60 minutes, and subsequently cooled at an approximate rate of 5 to 15° C. per minute, forming the composition, comprising a clast phase, a glass phase and at least one crystalline phase. The clast phase could include polymineralic and monomineralic clasts. The glass phase is distributed between the clast phase, bonding to clast particles and filling in nearly all surrounding interstitial space. The at least one crystalline phase is preferably contained in the glass phase and could include crystals formed from a melt with a mineral composition consistent with minerals selected from the group consisting of augite, pigeonite, maghemite and ilmanite.

In another embodiment, the invention provides a method for processing coal fly ash resulting in a vitreous, non-porous, impermeable polycrystalline composition.

The method could include air drying a sampling of the coal fly ash to less than 3% moisture; screening the coal fly ash with a 516 micron screen; and thereafter calcining the coal fly ash. The coal fly ash is then mechanically compacted at an approximate pressure of about 2 MPa (300 psi) in a tube at an approximate temperature of 1115° C. for approximately 10 hours, and subsequently cooled at an approximate rate of 10 to 20° C. per minute, forming the composition, comprising a clast phase, a glass phase, and at least one crystalline phase. The clast phase could include remnant clasts from the original feedstock constituents. The glass phase is distributed between the clast phase, bonding to clast particles and filling in nearly all surrounding interstitial space. The at least one crystalline phase is preferably contained in the glass phase and could include crystals formed from a melt with a mineral composition consistent with minerals selected from the group consisting of wollastonite, plagioclase feldspar, anhydrite, and calcium sulfate.

In another embodiment, the invention provides a method of processing waste materials selected from the group consisting of mine tailings, waste rock, quarry waste, slimes, fly ash, bottom ash, coal ash, incinerator ash, wood ash, and slag, resulting in a vitreous, non-porous, impermeable polycrystalline composition. The method could include subjecting the waste materials to a screening apparatus; conveying the waste materials from the screening apparatus to a heated rotating chamber for chemical transformation; conveying the waste materials from the heated rotating chamber to a second heated chamber optionally fixed with a vacuum; conveying the waste materials from the second heated chamber to a third heated chamber positioned within a heating element; applying pressure to the waste materials in the third heated chamber forming a hybrid rock; extruding the hybrid rock through a die device and removing the hybrid rock from the third heated chamber for subsequent use or further modification.

The benefits, advantages and surprising discoveries resulting from the present invention are, in a word, remarkable. First and foremost, a surprising discovery regarding applicant's invention is the presence of pyroxene inosilicates in the final composition and corresponding articles. Heretofore, pyroxene mineral compounds have not been detected in vitreous, low-porosity, low absorption synthetic rock materials such as applicant's present invention. Rather, pyroxenes have only been conventionally detected in highly porous, non-vitreous materials.

Also surprising is the fact that applicant's invention achieves maximum crystallization without the addition of crystallization catalysts or other nucleating agents. The raw material in applicant's invention is not heated beyond its melting point, but rather is only partially melted, which preserves crystallization nuclei sites already present in the glass matrix. Conversely, conventional synthetic rock compositions must employ crystallization catalysts to facilitate crystal formation because corresponding raw materials are heated to above their melting point and completely melted to a homogenous state during processing, which destroys potential crystallization sites. Conventional crystallization catalysis is required to provide a site for crystallization.

Yet another surprising discovery regarding applicant's invention is that the invention's glass matrix can comprise various amounts of glass, but that with less than approximately 20% glass the composition achieves impermeability. Conventional low or non-permeable synthetic rock materials require a high glass content to achieve impermeability.

The invention also has the advantage of providing compositions of matter comprising crystalline particles within a glass-binding liquid matrix, which allows the compositions to maintain a significant amount of plasticity at high temperature, unlike conventional clay tile. With this heightened plasticity level the compositions can, while initially heated or re-heated, be pressed, rolled or injected into other shapes and a variety of useful products after initial preparation. For instance, fine grained versions of the solid compositions can be pressed into aggregates and cobbles for a variety of construction uses, including for use in cement, road base and cobblestones. Alternatively, commonly known abrasives, such as silicon carbide, quartz and garnet, can be added to the composition for subsequent use in sanding blocks and grinding wheels.

Another advantage of the present invention is that the solid compositions and corresponding articles of manufacture are impermeable without the need for glazing. The invention's impermeability is directly related to the fact that, unlike conventional synthetic rock materials, the composition and articles contain essentially zero open porosity, due to the continuous glass matrix structure surrounding crystallites distributed throughout therein. With the exception of certain rare vitreous expensive clay products, such as porcelain, conventional synthetic rock and ceramic products require glazing to achieve impermeability.

The synthetic ceramics of the embodiments of the invention contain substantially zero open porosity (less than 0.5% open porosity), which results in less porous and more impermeable articles as compared to conventional ceramic materials. Surprisingly, voids (closed pores) may be induced in applicant's invention to result in a lighter weight construction-type material, without compromising the invention's impermeable characteristics.

Figure 2:
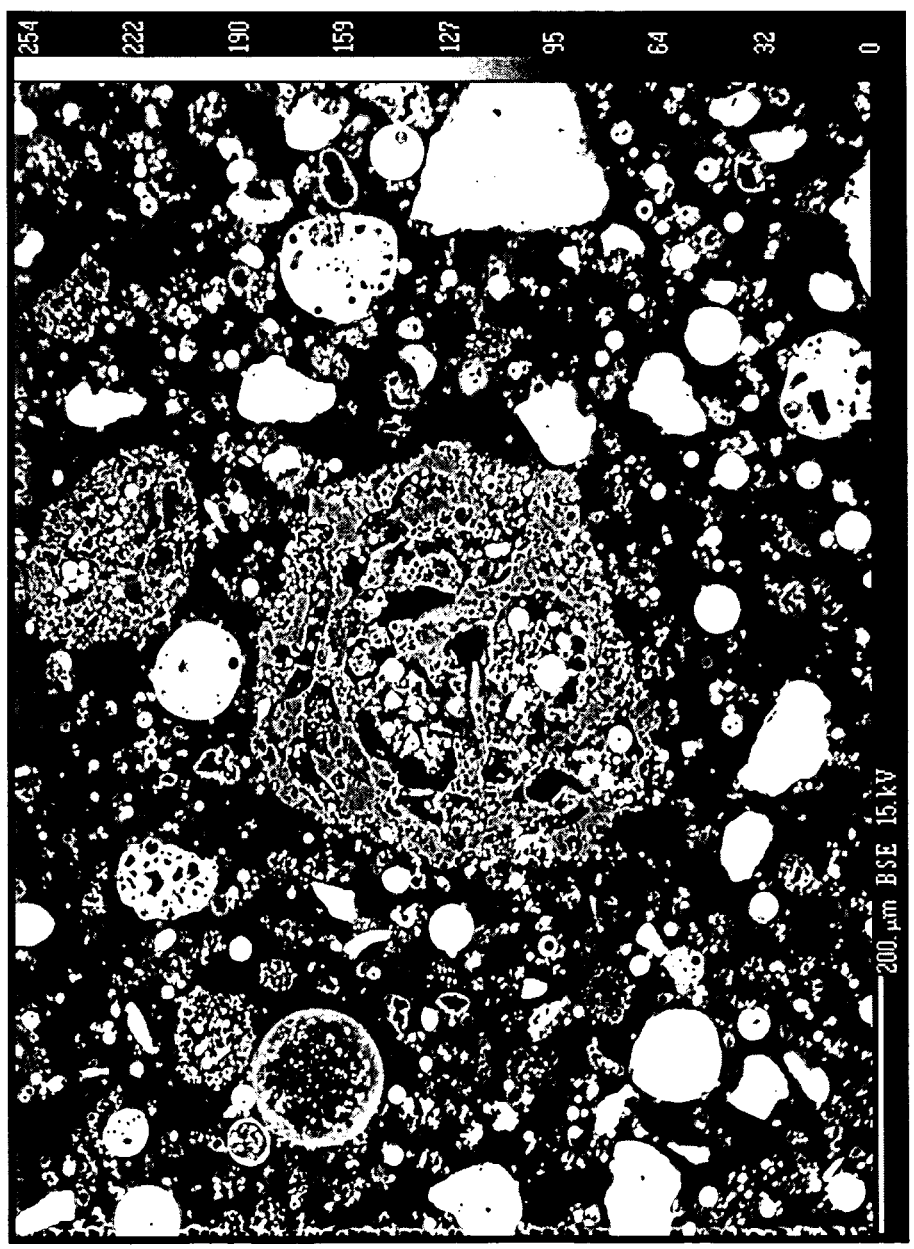
FIG. 2 shows a microscopic view of the fine grained fly-ash material largely composed of spherical-shaped glass beads with a smaller quantity of angular residual quartz.
Figure 3:
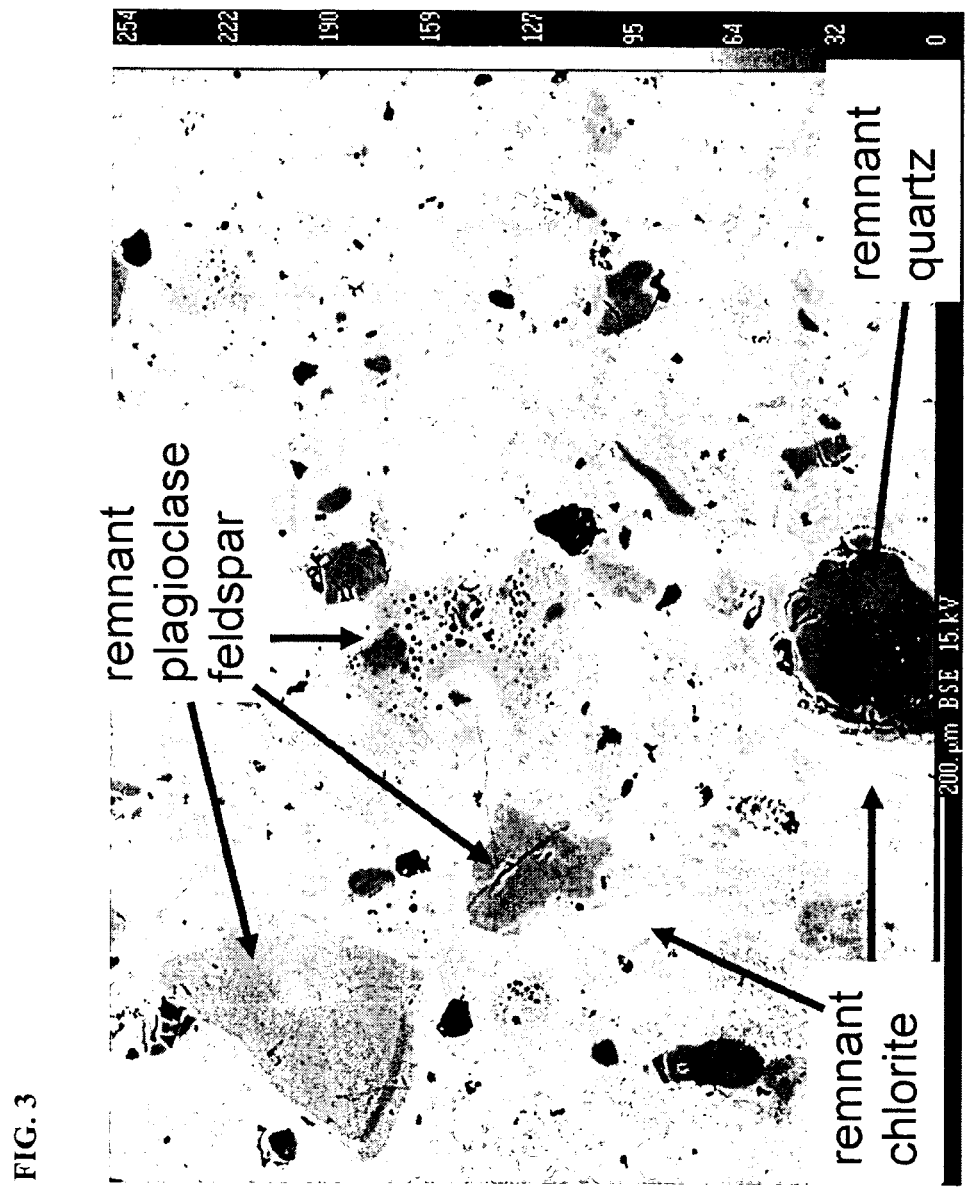
FIG. 3 shows a microscopic view of the incompletely melted remnants of the fine grained mineral and rock particles of the sedimentary feedstock materials that collectively comprise the "aggregate" phase of the hybrid rock material manufactured from mine tailings. The mineral grains are typically composed of more than one mineral type. In this example at least three mineral types are visible.
Figure 4:
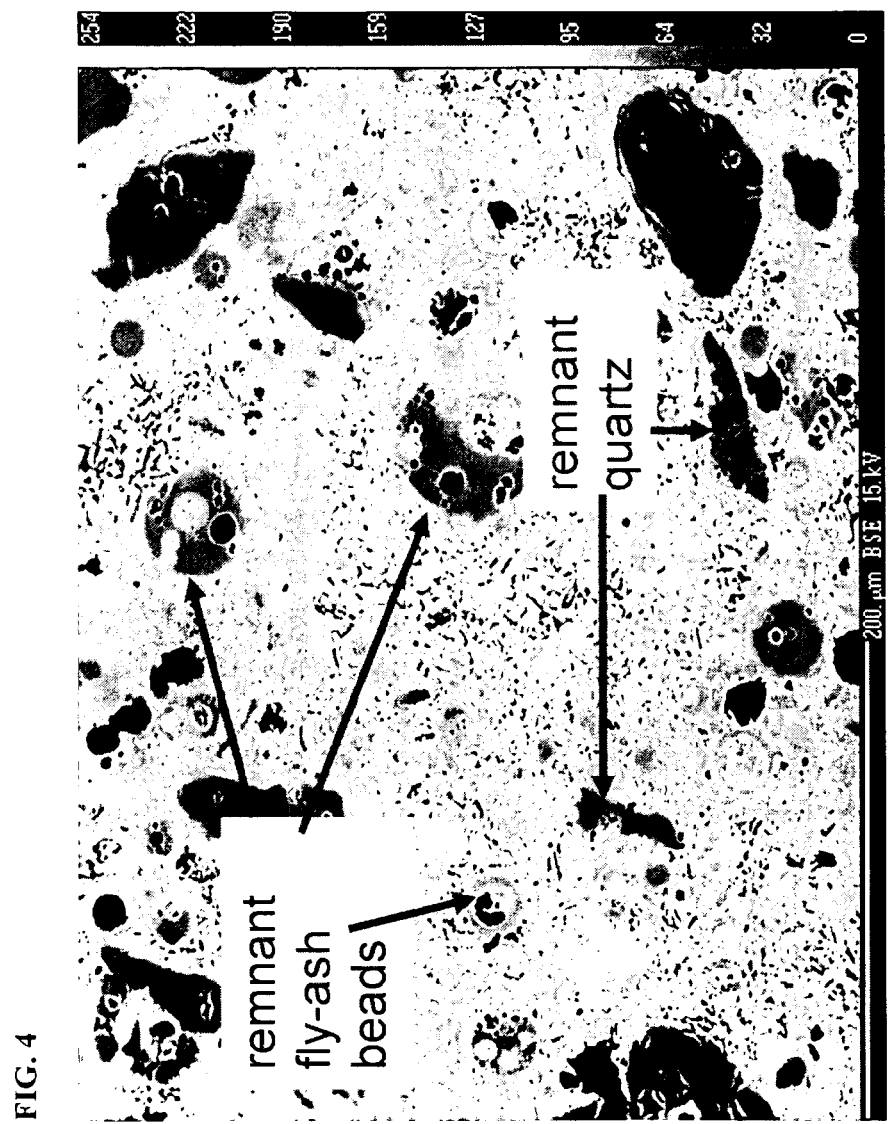
FIG. 4 shows a microscopic view of the incompletely melted remnants of quartz and glass bead grains that collectively comprise the "aggregate" phase of the hybrid rock material manufactured from waste fly-ash material. The original spherical particle shape of the fly-ash and angular shape of quartz grains are recognizable.

The feedstock materials used for the synthetic ceramics of the embodiments of the invention are typically waste materials or manufacturing byproducts that are particulate in their texture. Examples include fine particle residues from crushed rock quarries and fine grained fly-ash powder from coal burning power plants. Microscopic examination of these materials with the aid of a scanning electron microprobe instrument reveals very fine angular grains or clasts of various mineral components in the case of the pulverized quarry fines (FIG. 1) or spherical-shaped microscopic glass beads in the case of the fly-ash materials (FIG. 2). Incompletely melted remnants of these particulate or elastic sedimentary feedstock materials comprise the "aggregate" phase of the synthetic ceramics of the embodiments of the invention (FIGS. 3 and 4).

FIG. 1 shows a microscopic view of fine grained angular particles or clasts of a pulverized mineral and rock sediments found in crushed rock quarry fines and mine tailings. The particles seen here are composed of both single mineral grains and multi-mineral rock fragments. FIG. 2 shows a microscopic view of the fine grained fly-ash material largely composed of spherical-shaped glass beads with a smaller quantity of angular residual quartz. FIG. 3 shows a microscopic view of the incompletely melted remnants of the fine grained mineral and rock particles of the sedimentary feedstock materials that collectively comprise the "aggregate" phase of the hybrid rock material manufactured from mine tailings. The mineral grains are typically composed of more than one mineral type. In this example at least three mineral types are visible. FIG. 4 shows a microscopic view of the incompletely melted remnants of quartz and glass bead grains that collectively comprise the "aggregate" phase of the hybrid rock material manufactured from waste fly-ash material. The original spherical particle shape of the fly-ash and angular shape of quartz grains are recognizable.

Figure 5:
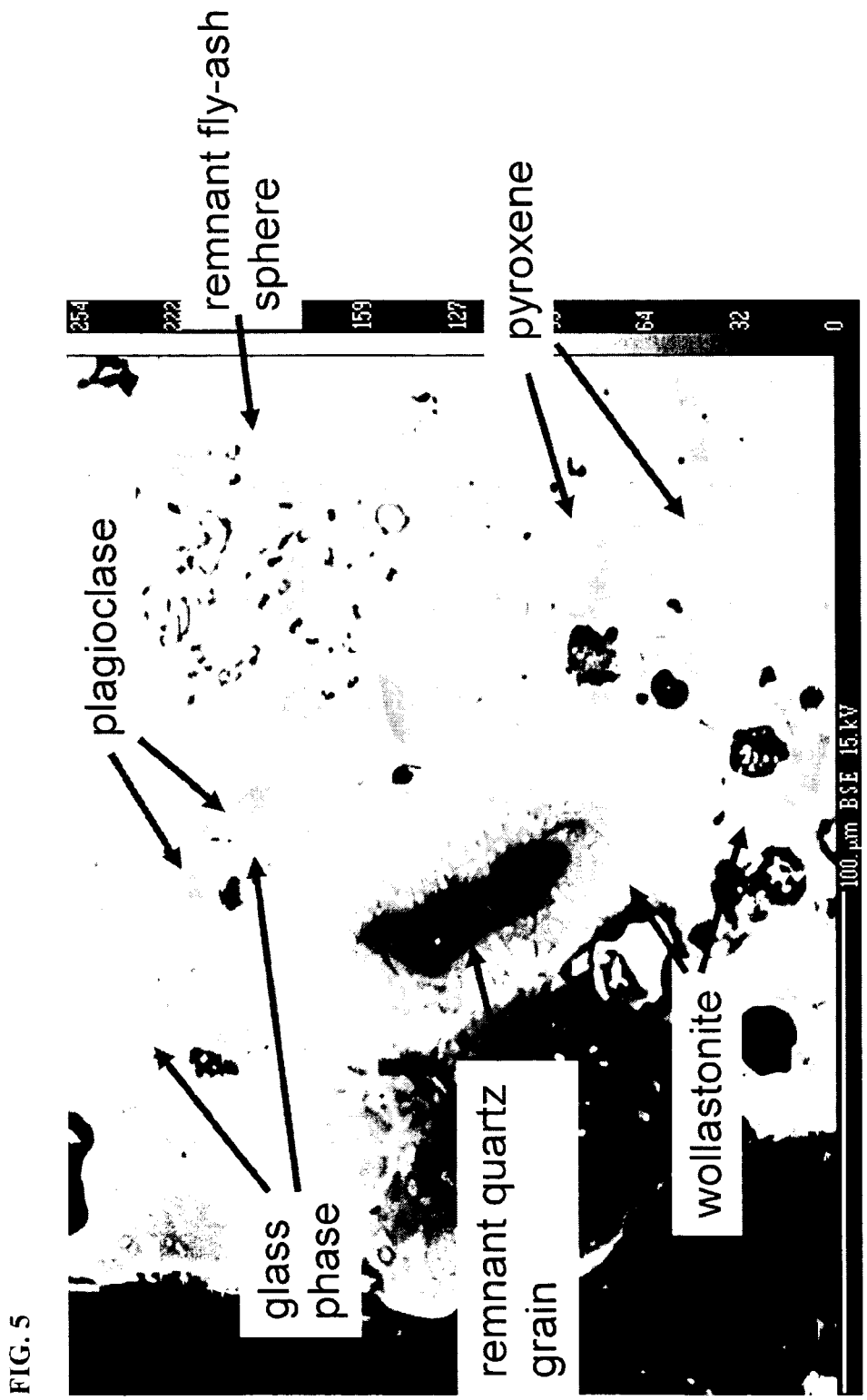
FIG. 5 shows a microscopic view of the microfabric of the hybrid rock material manufactured from waste fly-ash material. The remnant fly-ash and quartz clasts comprise the aggregate phase; the glass phase formed from the melting of the fly-ash forms the primary cement of the hybrid rock; and the crystallite phase is composed of small crystals of plagioclase, wollastonite, pyroxene, and anhydrite (shown in FIG. 6).
Figure 6:
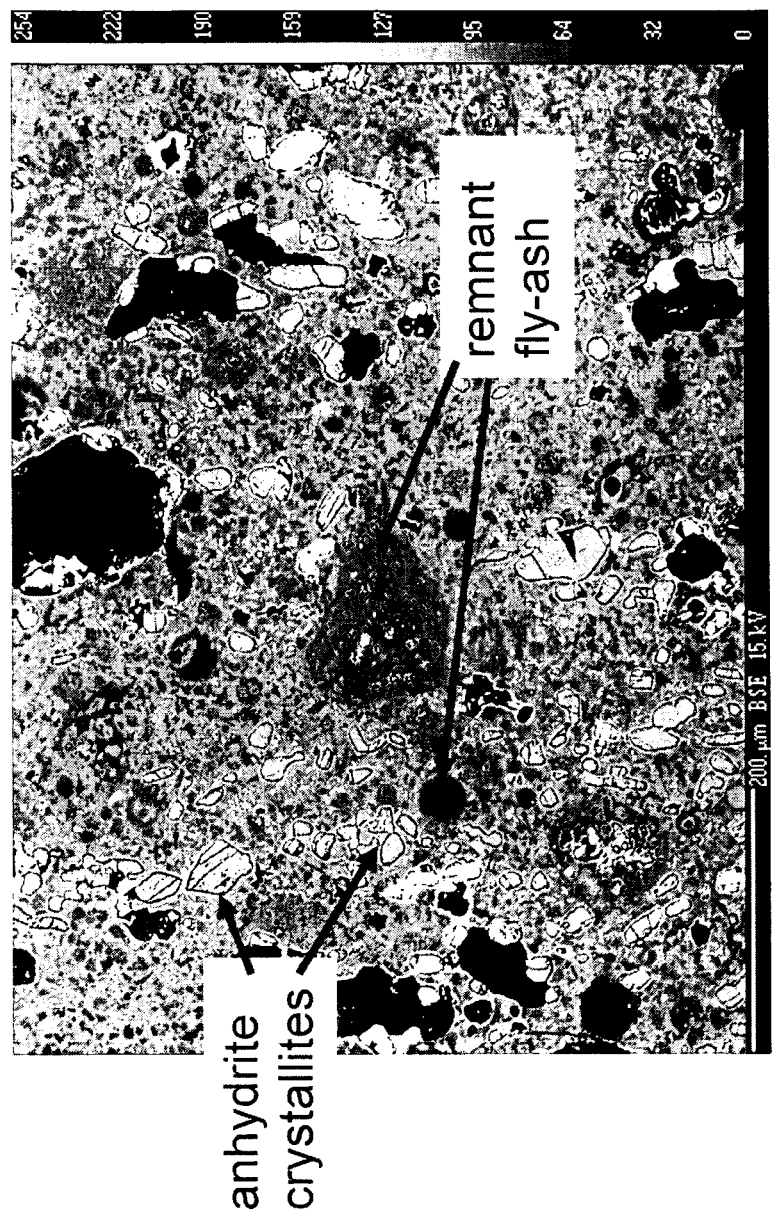
FIG. 6 shows as microscopic view of larger crystallites of newly formed anhydrite in the fly-ash hybrid rock. The anhydrite crystallites often arrange in linear fashion to form pseudo- or faux-marbling textures on the surface of the ceramic tile.

Besides the incompletely melted remnants of the fine grained mineral and rock particles of sedimentary feedstock from mine tailings, the synthetic ceramic of the embodiments also could include a glass phase and a crystallite phase. The synthetic ceramics of the embodiments of the invention typically possess a "glass" phase and a "crystallite" phase similar to fine grained igneous rocks such as basalt. The glass phase is produced by the partial melting of minerals such as feldspar in the example of mine tailings waste or the melting of the glass beads that comprise the fly-ash waste feedstock materials. The crystallites (i.e., small mineral crystals that grow from the liquid "melt") that occur in the hybrid rock material possess mineralogy similar to igneous rocks such as plagioclase feldspar and pyroxene also found in basalt; however, other crystallite mineralogy differ from those found in nature such as wollastonite and anhydrite. Collectively, this aforementioned suite of crystallite mineralogies do not occur in any natural igneous rock as they do in the hybrid rock manufactured from the waste fly-ash materials (FIGS. 5 and 6). Typically, the glass phase is continuous or co-continuous while crystallite phase is continuous or discrete.

FIG. 5 shows a microscopic view of the microfabric of the hybrid rock material manufactured from waste fly-ash material. The remnant fly-ash and quartz clasts comprise the aggregate phase; the glass phase formed from the melting of the fly-ash forms the primary cement of the hybrid rock; and the crystallite phase is composed of small crystals of plagioclase, wollastonite, pyroxene, and anhydrite (shown in FIG. 6). FIG. 6 shows as microscopic view of larger crystallites of newly formed anhydrite in the fly-ash hybrid rock. The anhydrite crystallites often arrange in linear fashion to form pseudo- or faux-marbling textures on the surface of the ceramic tile.

Figure 7:
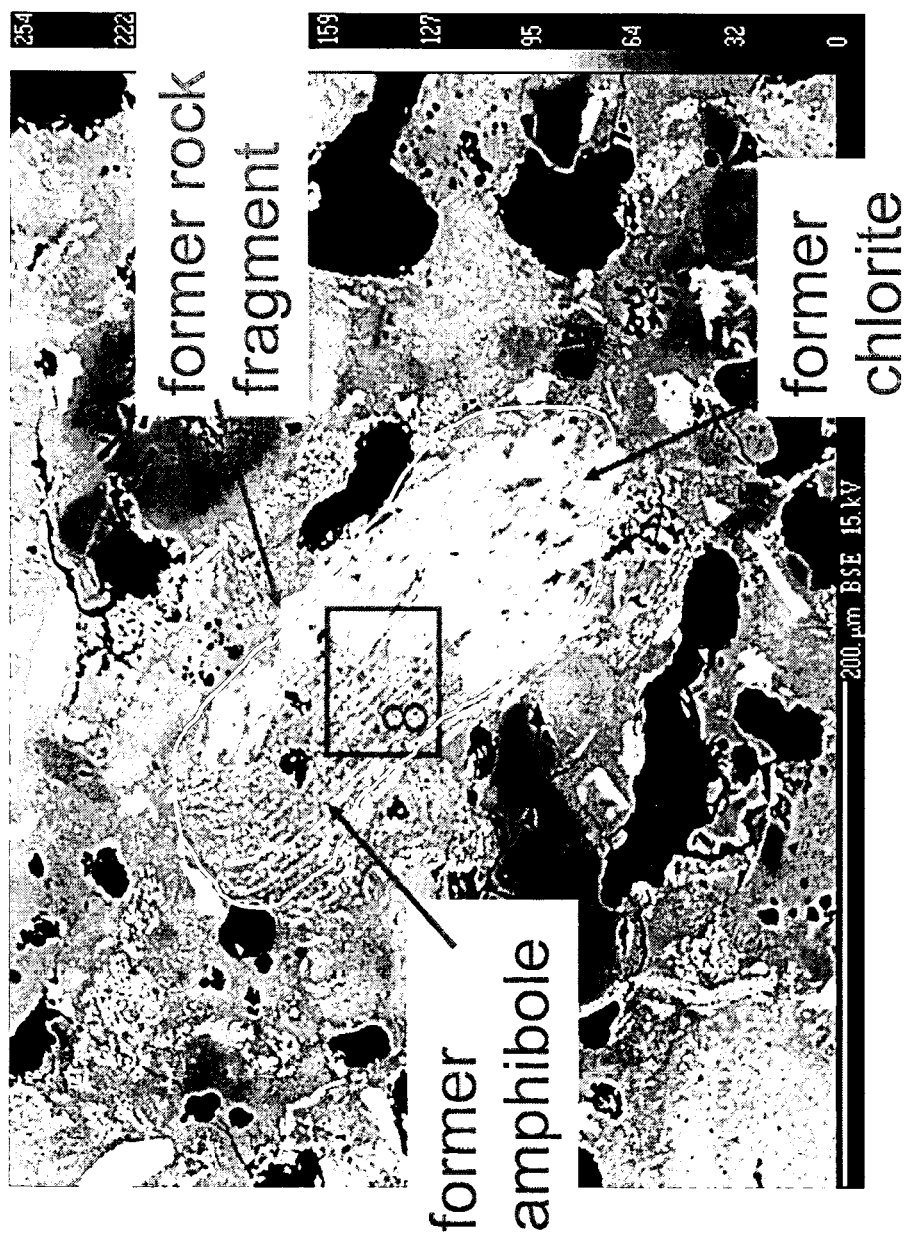
FIG. 7 shows microscopic view of the remnant of an igneous rock fragment (white boundary line) in the hybrid rock material. The rock fragment was originally composed of amphibole and chlorite. The box marked 8 shows the enlargement in FIG. 8.
Figure 8:
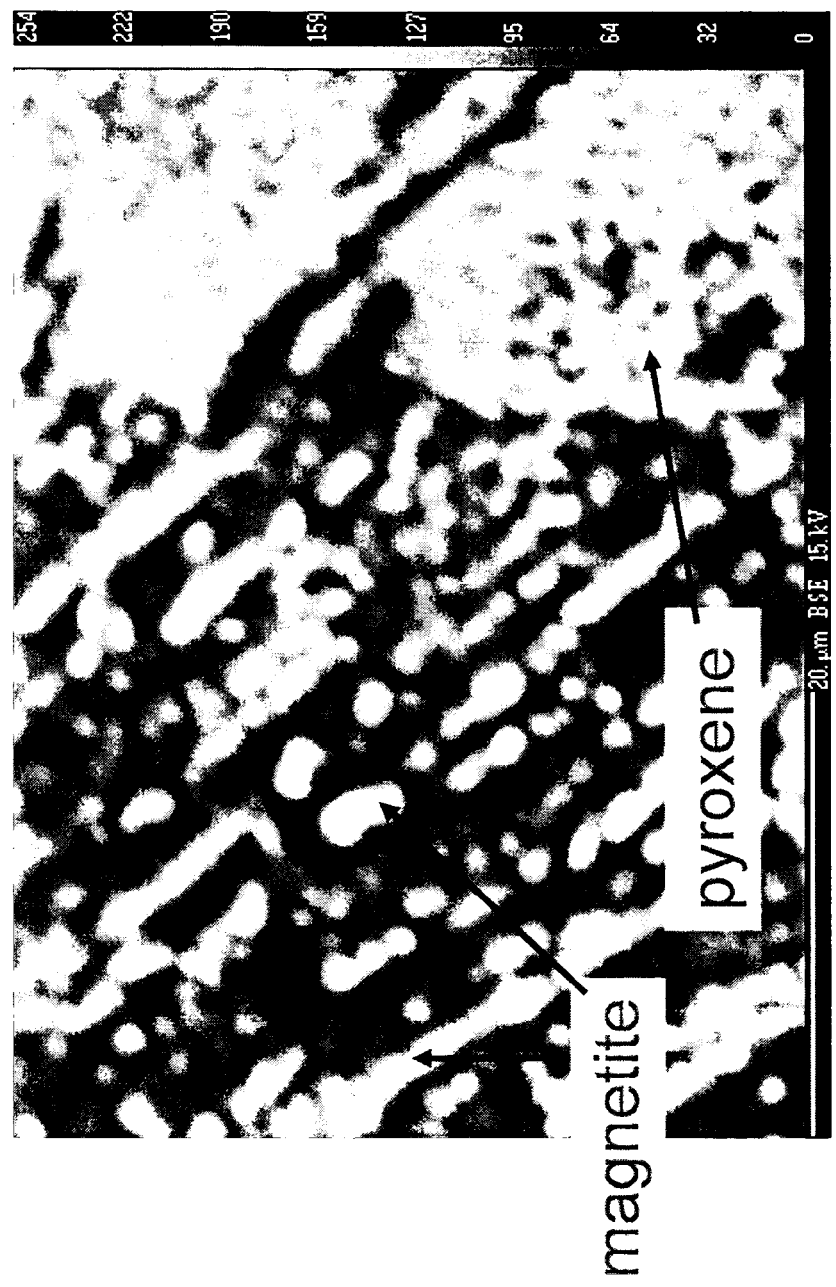
FIG. 8 shows a microscopic view of crystallites of magnetite that have formed in the area formerly occupied by amphibole while crystallites of pyroxene have replaced areas of a former chlorite mineral grain.

The waste feedstock materials such as mine tailings often contain minerals that are hydrous, i.e., water molecules are an integral constituent of the mineral's crystalline structure. Amphibole, mica, epidote, clay minerals, and zeolite minerals are examples of such hydrous minerals that may occur in the mine tailings or other wastes. At the process temperatures under which the hybrid rock material is manufactured, these hydrous minerals are unstable and other new minerals crystallize in their place within the same original mineral grain. This process also occurs in nature in metamorphic processes and is called pseudomorphous replacement. FIGS. 7 and 8 show the replacement of unstable hydrous amphibole and chlorite minerals by non-hydrous magnetite and pyroxene minerals.

FIG. 7 shows microscopic view of the remnant of an igneous rock fragment (white boundary line) in the hybrid rock material. The rock fragment was originally composed of amphibole and chlorite. The box marked 8 shows the enlargement in FIG. 8. FIG. 8 shows a microscopic view of crystallites of magnetite that have formed in the area formerly occupied by amphibole while crystallites of pyroxene have replaced areas of a former chlorite mineral grain.

The synthetic hybrid rock has the clastic textures of sedimentary rocks (i.e., relict grains of starting material), the granoblastic (or hornfelsic) textures of metamorphic rocks, and the glassy and crystallite textures of igneous rocks. Some very low pressure/ultra-high temperature metamorphic rocks could possess some similar textures (including partial melting), but because the starting materials of the synthetic hybrid rock of the embodiments of the invention are so compositionally diverse, it produces unusual mineralogy (e.g., the anhydrite). While partial melting at temperatures just above the solidus could be possible in nature, it is generally a slow process in which relict textures and mineralogies are recrystallized or annealed away. During the formation of the synthetic hybrid rock of the embodiments of the invention, the feedstock of the synthetic hybrid rock are heated and quenched so quickly (e.g., preferably at a heating rate in the range from 25 to 250° C. per minute and at a cooling rate in the range from 10 to 100° C. per minute) that the relict features are preserved. This is not known in nature.

As explained above, the embodiments of the invention relate to a novel synthetic ceramics having synthetic rock compositions and a process to manufacture useful articles containing the novel synthetic ceramics. The new process involves manipulating ceramic or synthetic rock materials at high temperatures where the materials are partially melted. This has the advantages of improved dimensional control, manufacturability of complex shapes, and superior properties of the finished material, including high strength, low porosity, low water absorption, high abrasion resistance, and the ability to polish to a high gloss. The test methods and embodiments of the invention are further exemplified by the examples below.

Test Methods (1) Tile breaking strength. The test used for determining the breaking strength of tiles is detailed in ASTM Test Method C948-98, which is summarized here. A tile to be tested is brushed clean, then centered and supported on the ends of three rods rigidly fixed to a stiff base and arranged in an equilateral triangle with 76.2 mm (3 in.) spans for larger tiles, or 83.1 mm (1.5 in.) spans for testing smaller tiles. Force is applied to the tile in the exact center of the triangular support by means of a 12.7 mm (0.5 in.) diameter stainless steel ball bearing, countersunk into one end of a 25.4 mm (1 in.) diameter and 50.8 mm (2 in.) long steel rod, and held there by a retaining collar. Force is applied to the tile, for example using an Instron universal testing machine, at a controlled rate of 3600 to 4900 N/min (800 to 1100 lbf/min) until the tile breaks. The force at break is recorded and reported as the tile breaking strength. The value of the tile breaking strength depends upon the dimensions of the tile, and strongly depends upon the thickness of the tile, and the choice of span.

(2) Modulus of rupture. The test used for determining modulus of rupture of our materials is detailed in ASTM Test Method C674-88, which is summarized here. The results differ from tile breaking strength because, in the modulus of rupture test, fixed sample geometry is used, and a breaking stress is calculated rather than a breaking force. This reported number is a better measure of the intrinsic strength of the material, where tile breaking strength is a measure of both the strength of the tile structure and its material. A cylindrical rod with a diameter of 6.4 mm (0.25 in.) is obtained from a test specimen by means of a wet diamond saw and a wet diamond core drill. This test rod is generally 38 to 89 mm (1.5 to 3.5 in.) long. The test rod is supported across two high-strength steel support rods, each with a diameter of 6.4 mm (0.25 in.) creating a known span of 19 to 76 mm (0.75 to 3 in.) with at least 6.4 mm (0.25 in.) overhang of the test rod beyond the span on either side. At a point midway between the support rods, load is applied, for example by an Instron universal testing machine, at a right angle to the test rod at a uniform rate sufficient to break the test rod within about one minute. The force at break (L) is recorded, along with the test rod diameter (d) and the span length (L). The modulus of rupture (M) is calculated from $M=8PL/\pi d^3$. Preferably at least 10 test rods are tested and the results are averaged to obtain a reported value of modulus of rupture.

(2) Porosity and water absorption. The test used for determining water absorption, bulk density, apparent porosity or apparent specific gravity is detailed in ASTM C373-88, which is summarized here. For our tests, we used the same sample geometry as the modulus of rupture test. That is, we collected the broken pieces (usually there are only two) of the test rod and used them for subsequent porosity and water absorption testing. The test specimens are dried in an oven at about 150° C., then weighed to determine the dry mass, D. The test specimens are then boiled in distilled water for 5 hours, then allowed to soak for an additional 24 hours to fully impregnate the open porosity with water at room temperature. The wet test specimens are then weighed while suspended in water at room temperature, by means of a wire basket suspended into water from one arm of a balance which has been previously counterbalanced with the basket suspended into water. This suspended mass, S is so determined. The test specimens are then removed, and excess surface water is removed from the specimens with a moist, lint-free cloth. The test specimens are then quickly weighed in air to determine the saturated mass, M. The water absorption, A, expresses as a percent, the relationship of the mass of water absorbed to the mass of the dry specimen. The water absorption is calculated from: $A=[(M-D)/D]\times 100\%$. The apparent porosity, P, expresses as a percent, the relationship of the volume of the open pores of the specimen to its exterior volume. The apparent porosity is calculated from: $P=[(M-D)/(M-S)]\times 100\%$ (4) Abrasion resistance. The test used for determining abrasion resistance is detailed in ASTM C501-84, "Standard Test Method for relative Resistance to Wear of Unglazed Ceramic Tile by the Taber Abraser," which is summarized here. Four square tile samples, with an edge length of 100 mm (4 in.) are center drilled to provide a hole for mounting on the center bolt of a Taber Abraser machine. The mass of a tile sample is determined and recorded as $W_0$ gm. The tile is mounted on the abrading machine, and an H-22 coarse Calibrade wheel is made to abrade the sample with a 9.8-N load for a total of 1000 cycles. The sample is then removed, and its mass is determined and recorded as $W_f$ gm. The Taber abrasive wear index, $I_w$ is calculated from: $I_w=88$ gm/$(W_0-W_f)$. The Taber abrasive wear index of the ceramic synthetic materials of the embodiments of the invention is greater than 50, preferably higher than 200, in some instances in the range of 50-400, preferably, 75-300, and more preferably, 100-275, most preferably 150-250.

(5) Gloss. Gloss is measured by a Horiba IG-320 Glass Checker and reported as a numerical value that expresses the intensity of luminous reflection on the surface of a polished tile. The value is determined by comparing the value obtained with a standard reflective surface to the intensity of reflected light on the polished tile. A glass of 100 (unit less) is defined as the gloss of a glass plate with a refractive index of 1.567. The device itself uses a more chemically stable polished black glass with a gloss of about 90 as an internal reference surface for calibration. The device uses a LED light source at a 60° angle of incidence and 60° viewing angle with a silicon photodiode photodetector to obtain an elliptical measurement area of 12×6 mm.

EXAMPLES

For each of the following examples, the starting material was Quarry Fines A, which has the general composition:

TABLE 1

Composition of Quarry Fines A

|  | mass % |
|---|---|
| loss on ignition | 4.83 |
| $SiO_2$ | 50.01 |
| $Al_2O_3$ | 15.88 |
| $Na_2O$ | 2.12 |
| MgO | 5.41 |
| $K_2O$ | 0.56 |
| CaO | 7.60 |
| $Fe_2O_3$ | 11.35 |
| MnO | 0.20 |
| $P_2O_5$ | 0.13 |
| $TiO_2$ | 0.67 |
| C, Organic | 0.06 |
| C, Inorganic | 0.21 |
| C, Total | 0.27 |
| S | 0.17 |

Figure 9:
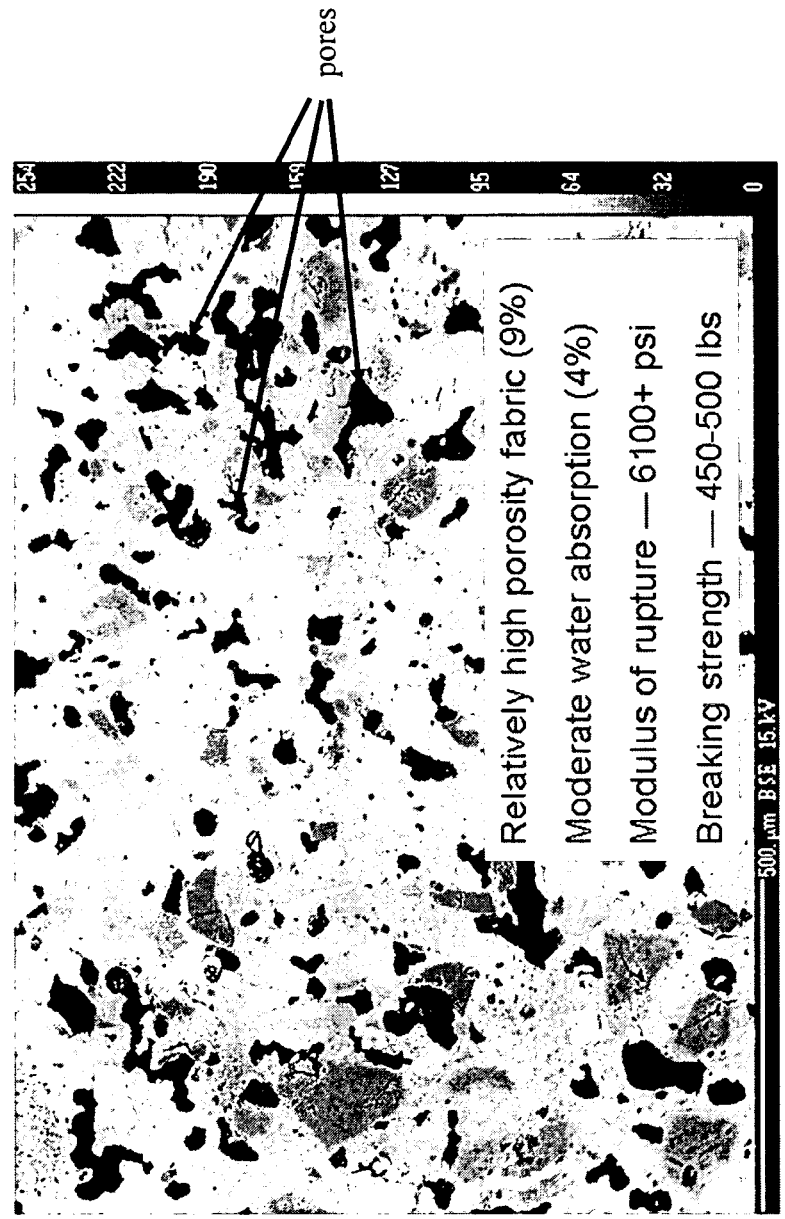
FIG. 9 is a scanning electron micrograph (SEM) of a thin section of the resulting tile.

Cold Pressing. Quarry Fines A were dried, screened through a 200-micron screen, mixed with 6% water, pressed into a green tile blank at 25° C. and 19 MPa (2,800 psi), which was then dried to make a green tile blank before subsequent work. The green tile blank was then fired in a Lex roller kiln to a maximum temperature of 1190° C. on three-hour firing schedule (cold to hot to cold) to make a ceramic tile. The resulting tile had relatively high porosity and relatively poor dimensional control, however it had sufficient properties to be considered a competitive product with low-grade non-vitreous ceramic tile. FIG. 9 is a scanning electron micrograph (SEM) of a thin section of the resulting tile that had a Taber abrasive wear index of 98. FIG. 9 shows a number of large and elongated pores, which are the darkest structures in the photomicrograph. The shape of these voids indicates that they are mostly connected to each other. This is confirmed by water absorption testing at 4%. This relatively high water absorption correlates with high porosity (9%) and moderate modulus of rupture (42 MPa or 6100 psi) and moderate tile strength (2 to 2.25 kN or 450 to 500 lbs). Other feedstock materials work well in this cold-pressing process, making tile with similar properties from mine tailings such as HIMT, mine development rock, ash, slag, slimes, and similar mineral waste materials. The compositions of other feedstock materials are shown in Table 2 below.

TABLE 2

Composition of some additional feed materials

| | Idaho-Maryland mine tailings mass % | Idaho-Maryland development rock mass % | coal fly ash mass % |
|---|---|---|---|
| loss on ignition | 11.29 | 4.19 | 19.1 |
| $SiO_2$ | 55.6 | 48.7 | 39.84 |
| $Al_2O_3$ | 9.89 | 14.8 | 13.23 |
| $Na_2O$ | 1.99 | 3.40 | 1.77 |
| MgO | 5.01 | 8.17 | 1.66 |
| $K_2O$ | 1.52 | 0.33 | 0.67 |
| CaO | 7.03 | 9.23 | 19.52 |
| $Fe_2O_3$ | 5.12 | 9.72 | 2.62 |
| MnO | 0.11 | 0.15 | 0.02 |
| $P_2O_5$ | 0.18 | 0.12 | 0.42 |
| $TiO_2$ | 0.67 | 0.93 | 0.62 |
| C (inorganic) | 0.23 | 0.55 | 5.16 |
| C (organic) | 2.33 | 0.02 | 1.65 |
| C (total) | 2.56 | 0.57 | 6.81 |
| S | 0.41 | 0.16 | 3.86 |

Green tile blanks may be produced by cold pressing (as described earlier), or other suitable methods, such as extrusion of a blend of raw material with 15-25% water. Green tile blanks are dried, and then preheated in a continuous process, preferably a roller-hearth kiln to a temperature at which at least some of the material melts to form a liquid phase. Tiles are rapidly transferred from the roller hearth kiln to a press, preferably by means of a section of high-speed rolls. In the press, the tile blank is forged, that is shaped and formed, preferably with punching through to make the best edges and dimensional control. After forging, the tiles are swept from the press into a continuous cooling furnace, preferably a second roller hearth kiln, which cools the tiles at a controlled rate, slow enough to avoid cracking from thermal shock or from well-known crystalline-reorganization phase changes such as α-β quartz inversion. Other feedstock materials work well in this hot-forging process, making tile with similar properties from mine tailings such as HIMT, mine development rock, ash, slag, slimes, and similar mineral waste materials.

Figure 10:
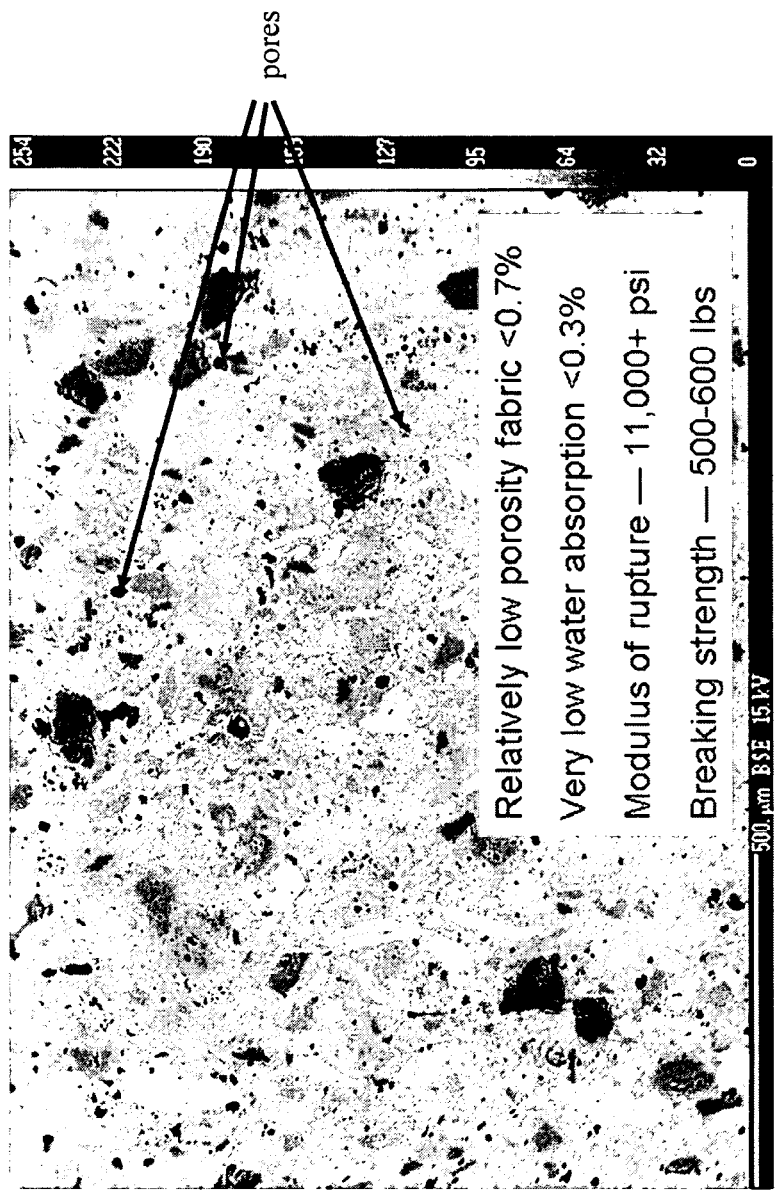
FIG. 10 is a scanning electron micrograph (SEM) of a thin section of the resulting hot-forged tile made from Quarry Fines A.

FIG. 10 is a scanning electron micrograph (SEM) of a thin section of the resulting hot-forged tile made from Quarry Fines A. FIG. 10 shows only a few small and mostly round pores, which are the darkest structures in the photomicrograph. The shape of these voids indicates that they are mostly isolated from each other. This is confirmed by water absorption testing at less than 0.3%. The tile has an excellent breaking strength of 2.25 kN to 2.67 kN (500 to 600 lbs), and the material has a high modulus of rupture of about 75 MPa (11,000 psi).

Figure 11:
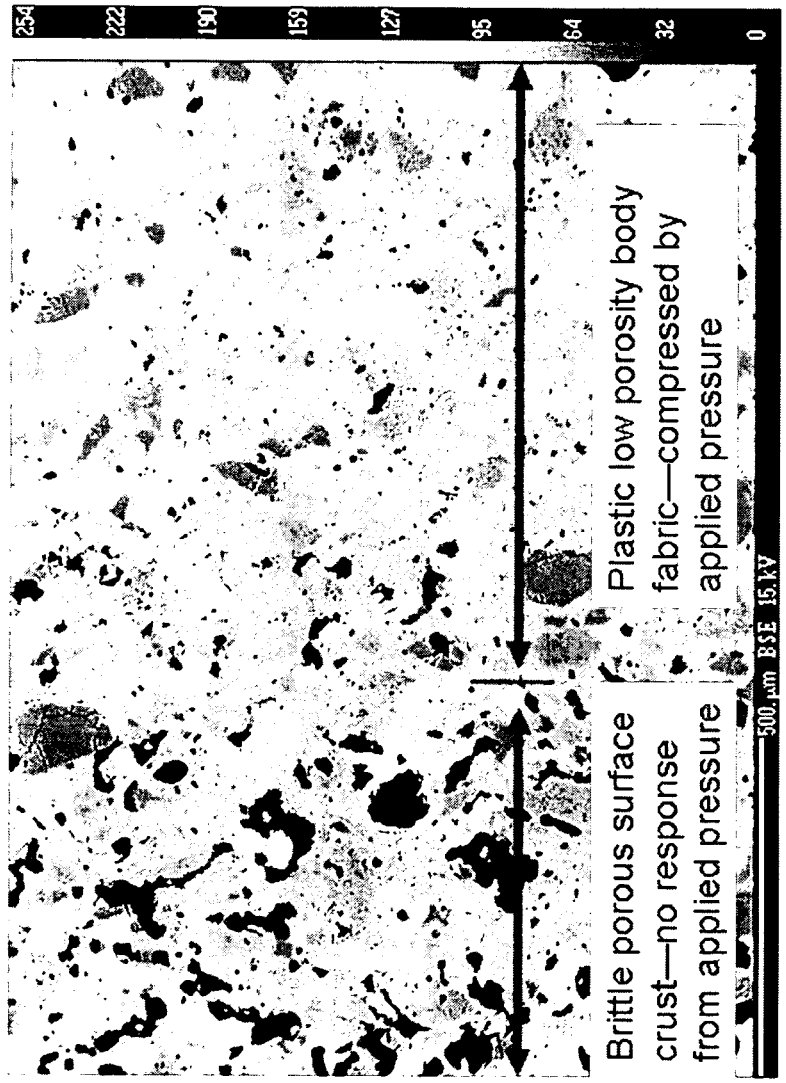
FIG. 11 is a scanning electron micrograph (SEM) of a thin section of a hot-forged tile.

FIG. 11 is a second scanning electron micrograph (SEM) of a thin section of the resulting hot-forged tile. FIG. 11 shows that, in one embodiment of the invention, a thin surface layer exists on the hot-forged tile that differs from the interior bulk. Because the surface is rapidly cooled during hot forging, the thin surface layer loses plasticity and does not compress. A short distance into the tile, about 0.5 to 5 mm, the crust rapidly transitions to the bulk interior fabric, which appears nearly non-porous as in FIG. 10. This more porous surface layer can be used advantageously as an excellent support for a glaze or other coating, or for an adhesive, where the interconnected porosity of the surface layer improves the bonding of the glaze, coating, or adhesive layer to the tile. Alternatively, it can be removed by grinding to reveal the nearly non-porous interior, which can be polished like stone and granite to a high gloss.

Patterns or designs may be applied to either surface of tiles with this process by modifying the dies. Curved parts, such as the shape of terra cotta roof tiles could be made by this process, even from flat stock. Finished parts with integrated assembly details could be manufactured directly during the pressing operation, such as interlocking edges, holes for fasteners, decorative textures.

Example 1

Quarry Fines A were dried, screened through a 200-micron screen, mixed with 6% water, pressed into a green tile blank at 25° C. and 19 MPa (2,800 psi), which was then dried to make a green tile blank before subsequent work. The cold, dry, green tile blank with a square shape and an edge dimension of about 32.4 cm (12.75 in.) was placed in a hot furnace at about 1185° C. on a platform of mullite tubes. The tile blank rapidly came up to the furnace temperature, and it was held there for 10 to 15 minutes. Using a long steel fork, the tile blank was then transferred in less than about 10 seconds to a press, where it was placed entirely within the cavity of a lower die of a 33.6-cm (13.25-inch) square tile mold. The upper die was lowered and approximately 11 MPa (1600 psi) was applied to the tile for about 1 second. The forged tile was then removed and transferred in less than 10 seconds to a cooling furnace at 800° C. FIG. 10 shows a SEM of a hot-forged tile made by the process of this invention. Referring to FIG. 12 and its subfigures, FIG. 12A shows the preheated tile blank 12 after transferring from a hot furnace to a press, where it has been placed entirely within the cavity of a lower die 13. Upper die 11 is lowered and pressure is applied as depicted in FIG. 12B. In FIG. 12C, the upper die 11 is raised and the forged tile 14 is revealed. In FIG. 12D, the forged tile is shown free from both die surfaces, ready for transfer to a cooling furnace.

The resulting tile had less than 0.5% water absorption, and could be polished to a high gloss (90 on the gloss meter). The edges of the tile were convex and wavy and required cutting to make a square tile. The pattern of the mullite tubes used to support the tile blank in the preheating furnace produced a variation in color in the surface of the tile, and that pattern extended through the body of the tile. More complicated decorative or functional patterns could be applied through the body of a tile by having a pattern on the surface in contact with the tile blank during preheating.

Example 2

Quarry Fines A were dried, screened through a 200-micron screen, mixed with 6% water, pressed into a green tile blank at 25° C. and 19 MPa (2,800 psi), which was then dried to make a green tile blank before subsequent work. The cold, dry, green tile blank with a square shape and an edge dimension of about 32.4 cm (12.75 in.) was placed in a hot furnace at 1185° C. on a pre-heated flat plate of nitrided silicon carbide (Advancer® SiC) The tile blank rapidly came up to the furnace temperature, and it was held there for 10 to 15 minutes. Using a long steel fork, the tile blank was then transferred in about 7 seconds to a press. Referring now to FIG. 13 and its subfigures, the preheated tile blank 22 was placed in a press over a set of four square cavities 25, each about 10.8-cm (4.25-inch) square. As shown in FIGS. 13A and 13B, an upper set of dies 21, affixed to a die platen 24, was lowered and punched through the hot tile blank, leaving an unpressed "picture frame" of scrap 26 above the lower die 23 while compressing the remainder of the tile blank primarily uniaxially in the 4 square cavities for about 2 seconds at about 28 MPa (4,100 psi). As shown in FIG. 13C, the upper die was raised, taking the scrap 26 with it, and the four hot-forged tiles 29 were removed as shown in FIG. 13D and transferred in less than 10 seconds to a cooling furnace at 800° C.

After cooling, the resulting tiles had less than 0.5% water absorption, and could be polished to a high gloss (90 on the gloss meter), modulus of rupture of 70 MPa (10,000 psi). The edges of the tiles were straight and sharp with crisp corners and required no post-finishing. The dimensions of the finished tiles were highly reproducible, with tile-to-tile variations of no more than 0.13 mm (±0.005 in.).

By the embodiments of the tiles of this invention, cracks or breaks that may occur in the tile during preheating are completely healed in the hot forging operation. That is, molten material in the tile flows and fills in cracks and welds together breaks in the tile during pressing such that a complete single crack-free tile is made.

Example 3

Quarry Fines A were dried, screened through a 200-micron screen, mixed with 6% water, pressed into a green tile blank at 25° C. and 19 MPa (2,800 psi), which was then dried to make a green tile blank before subsequent work. The cold, dry, green tile blank with a square shape and an edge dimension of about 32.4 cm (12.75 in.) was placed in a hot furnace at 1185° C. on a flat plate of nitrided silicon carbide (SiC) The tile blank rapidly came up to the furnace temperature, and it was held there for 10 to 15 minutes. Using a long steel fork, the tile blank was then transferred in about 4 seconds to a press. Referring now to FIG. 14 and its subfigures, the preheated tile blank 32 was placed in a press over a cavity 35 of a lower die 33 of a 33.6-cm (13.25-inch) square tile mold. Because the tile blank was wider than the lower die cavity 35, it did not sit inside the cavity, but rather was supported over it, approximately centered. As shown in FIG. 14A, which shows the bottom face of the upper die, the upper die 31 had a recessed pattern 34 including a "waffle" pattern, recessed lettering and a silhouette of a bear. As shown in FIG. 14B, the upper die was lowered and punched through the hot tile blank, leaving a frame of unpressed trim scrap 36 above the lower die 33 while compressing the remainder of the tile blank uniaxially in the cavity for about 2 seconds at about 11 MPa (1,600 psi). As shown in FIG. 14C, the upper die was raised, taking the scrap 36 with it, and the hot-forged tile 39 was removed and transferred in less than 8 seconds to a cooling furnace at 800° C.

After cooling, the resulting tile had Taber abrasive wear index in the range of 196-215, less than 0.5% water absorption, and could be polished to a high gloss (90 on the gloss meter), modulus of rupture of about 74 MPa (11,000 psi). The sheared edge of the tile was straight and sharp with crisp corners and required no post-finishing. The dimensions of the finished tile were highly reproducible, with tile-to-tile variations of no more than ±0.13 mm (±0.005 in.). The pattern from the upper die was reproduced sharply and clearly in the surface of the tile with the tiniest visual details transferred from the die to the finished part.

Any trim scrap (for example, scrap 26 or scrap 36 in FIGS. 13 and 14) generated may be recycled by grinding to a powder, then reusing that powder as at least a portion of the feed material to the process.

By the embodiments of the tiles of this invention, cracks or breaks that may occur in the tile during preheating are completely healed in the hot forging operation. That is, molten material in the tile flows and fills in cracks and welds together breaks in the tile during pressing such that a complete single crack-free tile is made.

Some of the uses of the synthetic ceramics of the embodiments of the invention include floor tile, wall tile, roof tile, integrated accommodation for fasteners, interlocking edge shapes. The tiles could be pressed in such a way as to leave thin webbing between adjacent tiles, like a chocolate bar, so that tiles could be broken apart. Because of the accurate control of dimensions with this technology, tiles could be pressed in such a way as to comprise integral spacers for grouting tiles. Today, these spacers are cheap plastic, but require a great deal of installation time. If the spacers were integrated into the tile itself, laying out a tiled floor installation would be much faster and more convenient. Prior to our invention, this could not be done because of poor dimensional control, especially for non-rectangular tile shapes.

Some of the unique attributes of the process of manufacturing the synthetic ceramics of the embodiments of the invention include the following: Manipulating material at high temperature while partially melted to give low porosity low water absorption, high strength, high abrasion resistance, ability to polish to high gloss; punching through during hot forging makes a sharp square edge that does not require further finishing and has excellent dimensional control with very low tile-to-tile size variation and forming patterns, designs, or textures applied by the hot forge.

This application discloses several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. A method of making a synthetic ceramic, comprising heating a green ceramic material to a plastically deformable state at a temperature range within 900-1400° C., transferring the heated green ceramic material to a press, pressing the plastically deformable heated green ceramic material in a die at 1,000 to 10,000 psi, and transferring the heated, pressed green ceramic material to a furnace to form the synthetic ceramic; wherein the synthetic ceramic is plastically deformable when reheated to the temperature range wherein the synthetic ceramic comprises a crystalline phase, a clast, and a glass phase.

2. The method of claim 1, wherein the method does not require a heated die.

3. The method of claim 1, wherein the method does not require exposing the green ceramic material, the heated green ceramic material or the heated pressed green ceramic material to vacuum.

4. The method of claim 1, wherein the synthetic ceramic is a ceramic tile.

5. The method of claim 1, wherein the heating the green ceramic material is to 1000-1200° C.

6. The method of claim 1, wherein the pressing the heated green ceramic material in a die is at 1,600 to 6,000 psi.

7. The method of claim 1, wherein the cooling to form the synthetic ceramic is in the range of 600-1000° C.

8. The method of claim 1, wherein the cooling to form the synthetic ceramic is in the range of about 775-825° C.

9. The method of claim 1, further comprising pressing the green ceramic material in a die to form a solidified material prior to heating the green ceramic material, wherein the green ceramic material comprises water.

10. The method of claim 1, further comprising cooling the heated, pressed green ceramic material to a temperature below 800° C.

11. A method of making a synthetic ceramic, comprising heating a green ceramic material to a plastically deformable state to a temperature within a temperature range sufficient to initiate partial melting of at least a portion of the green ceramic material, transferring the heated green ceramic material to a press, pressing the plastically deformable heated green ceramic material in a die under pressure, and transferring the heated, pressed green ceramic material to a furnace for cooling to form the synthetic ceramic; wherein the synthetic ceramic remains thermoplastic wherein the synthetic ceramic comprises a crystalline phase, a clast, and a glass phase.

12. The method of claim 11, wherein the method does not require a heated die.

13. The method of claim 11, wherein the method does not require exposing the green ceramic material, the heated green ceramic material or the heated pressed green ceramic material to vacuum.

14. The method of claim 11, wherein the synthetic ceramic is a ceramic tile.

15. The method of claim 11, wherein the green ceramic material is made by mixing quarry fines with water to form a mixture and extruding the mixture through a die.

16. The method of claim 11, wherein the pressing the heated green ceramic material in a die is at about 30 to 10,000 psi.

17. The method of claim 11, wherein the pressing the heated green ceramic material in a die is at about 160 to 10,000 psi.

18. The method of claim 11, further comprising pressing the green ceramic material in a die to form a solidified material prior to heating the green ceramic material, wherein the green ceramic material comprises water.

19. The method of claim 11, further comprising cooling the heated, pressed green ceramic material to a temperature below 800° C.

20. A method of making a synthetic ceramic, comprising heating a green ceramic material to a plastically deformable state to a temperature within a temperature range sufficient to initiate partial melting of at least a portion of the green ceramic material, transferring the heated green ceramic material to a press over a cavity, and punching the plastically deformable heated green ceramic material to punch an opening in the heated green ceramic material and form a punched out tile; cooling the punched out tile; wherein the punched out tile remains plastically deformable when reheated to said temperature range wherein the synthetic ceramic comprises a crystalline phase, a clast, and a glass phase.

21. The method of claim 20, wherein the punching comprises lowering a die into the cavity.

22. The method of claim 20, further comprising compressing the punched out tile in the cavity.

23. The method of claim 20, wherein the punched out tile comprises edges that are substantially straight and having corners and requiring no post-finishing.

24. The method of claim 23, wherein the punched out tile comprises a pattern, a design, an interlocking edge, a hole for a fastener, decorative texture or combination thereof.

25. The method of claim 20, further cooling the punched out tile in a cooling furnace.

26. The method of claim 20, wherein cooling the punched out tile comprises cooling the punched out tile to a temperature below 800° C.

* * * * *

UNITED STATES PATENT AND TRADEMARK OFFICE
CERTIFICATE OF CORRECTION

PATENT NO. : 9,102,569 B2  
APPLICATION NO. : 12/614102  
DATED : August 11, 2015  
INVENTOR(S) : Jerry Warmerdam et al.

It is certified that error appears in the above-identified patent and that said Letters Patent is hereby corrected as shown below:

On title page, item (73) Assignee, Lines 1-2  
replace "CERAMEXT, LLC, Penn Valley, CA (US)"  
with --CERAMEXT, LLC, Reno, NV (US)--.

Signed and Sealed this  
Twenty-sixth Day of July, 2016

Michelle K. Lee  
*Director of the United States Patent and Trademark Office*